(12) United States Patent
Barger et al.

(10) Patent No.: US 8,495,242 B2
(45) Date of Patent: Jul. 23, 2013

(54) AUTOMATED MEDIA DELIVERY SYSTEM

(75) Inventors: Sean Barger, Mill Valley, CA (US);
Steve Johnson, Mill Valley, CA (US);
Matt Butler, Beaverton, OR (US); Jerry Destremps, Sausalito, CA (US); David Pochron, Cambridge, WI (US); Trent Brown, San Anselmo, CA (US)

(73) Assignee: Automated Media Processing Solutions, Inc., Sausalito, CA (US)

( * ) Notice: Subject to any disclaimer, the term of this patent is extended or adjusted under 35 U.S.C. 154(b) by 76 days.

(21) Appl. No.: 12/713,637

(22) Filed: Feb. 26, 2010

(65) Prior Publication Data

US 2010/0153495 A1    Jun. 17, 2010

Related U.S. Application Data

(60) Division of application No. 12/173,747, filed on Jul. 15, 2008, which is a division of application No. 11/269,916, filed on Nov. 7, 2005, now abandoned, which is a continuation-in-part of application No. 09/929,904, filed on Aug. 14, 2001, now Pat. No. 6,964,009, which is a continuation of application No. 09/425,326, filed on Oct. 21, 1999, now Pat. No. 6,792,575.

(51) Int. Cl.
*G06F 15/16* (2006.01)

(52) U.S. Cl.
USPC .............. 709/236; 709/246; 341/50; 708/204

(58) Field of Classification Search
USPC ................. 709/263, 234, 231, 226, 219, 217, 709/204, 203, 200; 370/552, 468, 431, 353, 370/352, 330, 280, 241; 341/50; 708/204
See application file for complete search history.

(56) References Cited

U.S. PATENT DOCUMENTS

| 5,088,052 A | 2/1992 | Spielman et al. |
| 5,355,472 A | 10/1994 | Lewis |
| 5,442,771 A | 8/1995 | Filepp et al. |
| 5,530,852 A | 6/1996 | Meske, Jr. et al. |
| 5,701,451 A | 12/1997 | Rogers et al. |

(Continued)

FOREIGN PATENT DOCUMENTS

| AU | A-53031/98 | 8/1998 |
| EP | 0747842 | 12/1996 |

(Continued)

OTHER PUBLICATIONS

Berinstein, Paula; "The Big Picture; Text and Graphics on UMI's ProQuest Direct: The Best (Yet) of Both Worlds", Mar. 1997; retrieved on Mar. 23, 2004 from website: http://infotoday.com/online/MarOL97/picture3.html, 11 pages.

(Continued)

*Primary Examiner* — David Lazaro
*Assistant Examiner* — Charles Murphy
(74) *Attorney, Agent, or Firm* — Michael A. Glenn; Glenn Patent Group

(57) ABSTRACT

An automatic graphics delivery system that operates in parallel with an existing Web site infrastructure is provided. The system streamlines the post-production process by automating the production of media through content generation procedures controlled by proprietary tags placed by an author within URLs embedded within Web documents.

20 Claims, 23 Drawing Sheets

U.S. PATENT DOCUMENTS

| | | | |
|---|---|---|---|
| 5,708,845 | A | 1/1998 | Wistendahl et al. |
| 5,710,918 | A | 1/1998 | Lagarde et al. |
| 5,737,619 | A | 4/1998 | Judson |
| 5,745,908 | A | 4/1998 | Anderson et al. |
| 5,758,110 | A | 5/1998 | Boss et al. |
| 5,761,655 | A | 6/1998 | Hoffman |
| 5,793,964 | A | 8/1998 | Rogers et al. |
| 5,819,261 | A | 10/1998 | Takahashi et al. |
| 5,822,436 | A | 10/1998 | Rhoads |
| 5,845,084 | A | 12/1998 | Cordell et al. |
| 5,845,279 | A * | 12/1998 | Garofalakis et al. ............ 1/1 |
| 5,845,299 | A | 12/1998 | Arora et al. |
| 5,860,068 | A | 1/1999 | Cook |
| 5,860,073 | A | 1/1999 | Ferrel et al. |
| 5,861,881 | A | 1/1999 | Freeman et al. |
| 5,862,325 | A | 1/1999 | Reed et al. |
| 5,864,337 | A | 1/1999 | Marvin |
| 5,870,552 | A | 2/1999 | Dozier et al. |
| 5,880,740 | A | 3/1999 | Halliday et al. |
| 5,890,170 | A | 3/1999 | Sidana |
| 5,895,476 | A | 4/1999 | Orr et al. |
| 5,895,477 | A | 4/1999 | Orr et al. |
| 5,903,892 | A | 5/1999 | Hoffert et al. |
| 5,937,160 | A | 8/1999 | Davis et al. |
| 5,943,680 | A | 8/1999 | Ohga et al. |
| 5,956,737 | A | 9/1999 | King et al. |
| 6,009,436 | A | 12/1999 | Motoyama et al. |
| 6,311,185 | B1 | 10/2001 | Markowitz et al. |
| 6,456,305 | B1 | 9/2002 | Qureshi et al. |
| 6,463,445 | B1 * | 10/2002 | Suzuki et al. ............ 1/1 |
| 6,483,851 | B1 | 11/2002 | Neogi |
| 6,484,149 | B1 | 11/2002 | Jemmes et al. |
| 6,563,517 | B1 * | 5/2003 | Bhagwat et al. ............ 715/735 |
| 6,591,280 | B2 | 7/2003 | Orr |
| 6,623,529 | B1 | 9/2003 | Lakritz |
| 6,909,708 | B1 * | 6/2005 | Krishnaswamy et al. .... 370/352 |
| 6,938,073 | B1 | 8/2005 | Mendhekar et al. |
| 7,284,201 | B2 | 10/2007 | Cohen-Solal |
| 7,313,361 | B2 | 12/2007 | Steelberg et al. |
| 7,406,434 | B1 | 7/2008 | Chang et al. |
| 7,477,688 | B1 | 1/2009 | Zhang et al. |
| 7,673,063 | B2 | 3/2010 | Xie et al. |
| 2003/0225568 | A1 | 12/2003 | Salmonsen |
| 2004/0025176 | A1 | 2/2004 | Franklin et al. |
| 2005/0091311 | A1 | 4/2005 | Lund et al. |
| 2005/0255852 | A1 | 11/2005 | Steelberg et al. |
| 2005/0278794 | A1 | 12/2005 | Leinonen et al. |
| 2006/0015580 | A1 | 1/2006 | Gabriel et al. |
| 2006/0127059 | A1 | 6/2006 | Fanning |
| 2007/0061198 | A1 | 3/2007 | Ramer et al. |
| 2007/0234213 | A1 | 10/2007 | Krikorian et al. |
| 2008/0155230 | A1 | 6/2008 | Robbins et al. |
| 2008/0186377 | A1 | 8/2008 | Eriksson et al. |
| 2008/0195938 | A1 | 8/2008 | Tischer et al. |
| 2008/0205389 | A1 | 8/2008 | Fang et al. |
| 2008/0207182 | A1 | 8/2008 | Maharajh et al. |
| 2009/0013347 | A1 | 1/2009 | Ahanger et al. |
| 2009/0070485 | A1 | 3/2009 | Barger et al. |
| 2009/0089422 | A1 | 4/2009 | Barger et al. |
| 2009/0240569 | A1 | 9/2009 | Ramer et al. |
| 2009/0254672 | A1 | 10/2009 | Zhang |
| 2010/0046842 | A1 | 2/2010 | Conwell |
| 2010/0153495 | A1 | 6/2010 | Barger et al. |
| 2011/0221745 | A1 | 9/2011 | Goldman et al. |
| 2011/0279638 | A1 | 11/2011 | Periyannan et al. |
| 2012/0016858 | A1 | 1/2012 | Rathod |

FOREIGN PATENT DOCUMENTS

| | | |
|---|---|---|
| EP | 0782085 | 7/1997 |
| EP | 0818907 | 1/1998 |
| EP | 0843276 | 5/1998 |
| EP | 0876034 | 11/1998 |
| EP | 0883068 | 12/1998 |
| EP | 0886409 | 12/1998 |
| EP | 0895171 | 2/1999 |
| EP | 0926607 | 6/1999 |
| EP | 09499571 | 10/1999 |
| WO | WO 97/49252 | 12/1997 |
| WO | WO 98/40842 | 9/1998 |
| WO | WO 98/43177 | 10/1998 |

OTHER PUBLICATIONS

Bulterman, Dick.C.A.; *Models, Media and Motion: Using the Web to Support Multimedia Documents;* Proceedings of 1997 Int'l Conf. on Multimedia Modeling; p. 17-20; Nov. 1997; Singapore.

Dobson, R.; *Animating Your Web Pages with Direct Animation;* Web Techniques; vol. 3, No. 6, p. 49-52; Jun. 1998.

McNeil, Sara; Research Interests; retrieved on Mar. 18, 2004 from website: http//www.coe.uh.edu/'smcneil/research.htm, 3 pages.

Mohler, J.L.; *Migrating Course Materials to the World Wide Web: A Case Study of the Department of Technical Graphics at Purdue University;* Computer Networks and ISDN Systems; vol. 30, Issues 20-21, pp. 1981-1990; Nov. 12, 1988.

Sakaguchi, et al.; "A browsing tool for multi-lingual documents for users without multi-lingual fonts"; 1996; ACM International Conference on Digital Libraries, pp. 63-71.

Tables of Contents service for Computers & Geosciences; Copyright 1997; Computers and GeoSciences, vol. 23, Issue 5, retrieved on Mar. 18, 2004 from website: http://library.iem.ac.ru/comp&geo/00983004/sz977014.html, 2 pages.

Zaiane, et al.; "Mining multimedia data"; Nov. 1998; ACM Conference of the Center for Advanced Studies on Collaborative research, pp. 1-18.

* cited by examiner

US 8,495,242 B2

AUTOMATED MEDIA DELIVERY SYSTEM

CROSS REFERENCE TO RELATED APPLICATIONS

This application is a Divisional of U.S. Ser. No. 12/173,747, filed Jul. 15, 2008, which is a Divisional of U.S. Ser. No. 11/269,916, filed Nov. 7, 2005 now abandoned, which is a Continuation-in-Part of U.S. Ser. No. 09/929,904, filed Aug. 14, 2001, now U.S. Pat. No. 6,964,009 granted on Nov. 8, 2005, which is a Continuation-in-Part of U.S. Ser. No. 09/425,326, filed Oct. 21, 1999, now U.S. Pat. No. 6,792,575, granted on Sep. 14, 2004, each of which is hereby incorporated in its entirety by this reference thereto.

BACKGROUND OF THE INVENTION

1. Technical Field

The invention relates to software systems. More particularly, the invention relates to an Internet server-based software system that provides delivery of automated graphics and other media to Web sites for access by an end user or consumer.

2. Description of the Prior Art

Most Web sites today are primarily handmade. From the guy publishing a simple online technology newsletter from his home, to the Fortune 1000 company's multi-tiered site with hundreds of pages of text, images, and animations, the Web developer and each of his HTML-coding and graphics-producing coworkers toil page by page and image by image. Thousands of established online companies employ hundreds of highly-skilled workers just to produce and maintain their Web sites. After all, the Web is now a major selling vehicle and marketing medium for many of these companies. The Web has even sprouted service industries such as, for example, public companies with multi-billion dollar valuations created just to consult and produce Web sites for others.

Most Web developers who use established WYSIWYG tools in the industry still must produce each page on their Web site one by one. The same rate applies to preparing and placing images, animations, and other visual assets. Each page represents its own set of issues ranging from whether to use GIF, JPEG, or PNG file formats, to finding the optimum bit depth for each image to ensure the fastest downloading through the different browsers of the consumer. The bottle-necked state of the customer's workflow to produce graphics for Web pages can be described as follows:

Current Workflow for Creating Web Graphics
Original Artwork/Asset Creation
  Use third-party point products
Asset Editing
  Scale/reduce/slice
Asset Format Conversion
  JPEG/GIF/PNG
Asset Staging
  Place in Web file system
  Edit HTML
Create/Modify HTML for particular page
Store HTML on Web server
View final pages
Repeat process for each version of each graphic on each page
Estimated time
  Two hours per page times the number of pages Also, from a user's perspective, the current state of the art is to offer the consumer zooming and panning capabilities so that by clicking on an image the consumer can view more closely or from a different angle. On the horizon are pages with three-dimensional imagery that enable a user to move around a page that can look more like a room than a brochure. While interesting, these features are merely incremental improvements to a consumer's surfing experience.

D. C. A. Bulterman, *Models, Media, and Motion: Using the Web to Support Multimedia Documents*, Proceedings of 1997 International Conference on Multimedia Modeling, Singapore, 17-20 Nov. 1997 discloses "an effort underway by members of industry, research centers and user groups to define a standard document format that can be used in conjunction with time-based transport protocols over the Internet and intranets to support rich multimedia presentations. The paper outlines the goals of the W3C's Synchronized Multimedia working group and presents an initial description of the first version of the proposed multimedia document model and format."

*Text and Graphics on UMI's Pro Quest Direct: The Best (yet) of both Worlds, Online*, vol. 21, no. 2, pp. 73-7, March-April 1997 discloses an information system that offers "periodical and newspaper content covering a wide range of business, news, and professional topics . . . letting the user search both text and graphics and build the product to suit. Articles can be retrieved in varying levels of detail: citation, abstracts, full text, and text with graphics. Images come in two flavors: Page Image, a virtual photocopy, and Text+Graphics, in which graphics are stored separately from the text and are manipulable as discrete items . . . . [The system] comes in two versions: Windows and Web."

John Mills Dudley, *Network-Based Classified Information Systems*, AU-A-53031/98 (27/08/98) discloses a "system for automatically creating databases containing industry, service, product and subject classification data, contact data, geographic location data (CCG-data) and links to web pages from HTML, XML, or SGML encoded web pages posted on computer networks such as Internets or Intranets . . . . The . . . databases may be searched for references (URLs) to web pages by use of enquiries which reference one or more of the items of the CCG-data. Alternatively, enquiries referencing the CCG-data in the databases may supply contact data without web page references. Data duplication and coordination is reduced by including in the web page CCG-data display controls which are used by web browsers to format for display the same data that is used to automatically update the databases."

Cordell et al, Automatic Data Display Formatting with A Networking Application, U.S. Pat. No. 5,845,084 (Dec. 1, 1998) discloses a placeholder image mechanism. "When a data request is made, the data transfer rate is monitored. When the receive data transfer rate is slow, and the data contains an embedded graphical image of unknown dimensions, a small placeholder image is automatically displayed for the user instead of the actual data. The small placeholder image holds a place on a display device for the data or the embedded graphical image until the data or embedded graphical image is received. When embedded graphical image is received, the placeholder image is removed, and the display device is reformatted to display the embedded graphical image."

Jonathon R. T. Lewis, System For Substituting Tags For Non-Editable Data Sets In Hypertext Documents And Updating Web Files Containing Links Between Data Sets Corresponding To Changes Made To The Tags, U.S. Pat. No. 5,355,472 (Oct. 11, 1994) discloses a "hypertext data processing system wherein data sets participating in the hypertext document may be edited, the data processing system inserting tags into the data sets at locations corresponding to the hypertext links to create a file which is editable by an editor and the data processing system removing the tags, generating a revised data set and updating the link information after the editing process. Its main purpose is to preserve the linking hierarchy that may get lost when the individual data sets get modified."

Wistendahl et al, System for Mapping Hot Spots in Media Content Interactive Digital Media Program, U.S. Pat. No. 5,708,845 (Jan. 13, 1998) discloses a "system for allowing media content to be used in an interactive digital media (IDM) program [that] has Frame Data for the media content and object mapping data (N Data) representing the frame addresses and display location coordinates for objects appearing in the media content. The N Data are maintained separately from the Frame Data for the media content, so that the media content can be kept intact without embedded codes and can be played back on any system. The IDM program has established linkages connecting the objects mapped by the N Data to other functions to be performed in conjunction with display of the media content. Selection of an object appearing in the media content with a pointer results in initiation of the interactive function. A broad base of existing non-interactive media content, such as movies, videos, advertising, and television programming can be converted to interactive digital media use. An authoring system for creating IDM programs has an object outlining tool and an object motion tracking tool for facilitating the generation of N Data. In a data storage disk, the Frame Data and the N Data are stored on separate sectors. In a network system, the object mapping data and IDM program are downloaded to a subscriber terminal and used in conjunction with presentation of the media content."

Rogers et al, Method for Fulfilling Requests of A Web Browser, U.S. Pat. No. 5,701,451 (Dec. 23, 1997) and Lagarde et al, Method for Distributed Task Fulfillment of Web Browser Requests, U.S. Pat. No. 5,710,918 (Jan. 20, 1998) disclose essentially "improvements which achieve a means for accepting Web client requests for information, obtaining data from one or more databases which may be located on multiple platforms at different physical locations on an Internet or on the Internet, processing that data into meaningful information, and presenting that information to the Web client in a text or graphics display at a location specified by the request."

Tyan et al, HTML Generator, European Patent Application No. EP 0843276 (May 20, 1998) discloses "generating an HTML file based on an input bitmap image, and is particularly directed to automatic generation of an HTML file, based on a scanned-in document image, with the HTML file in turn being used to generate a Web page that accurately reproduces the layout of the original input bitmap image."

TrueSpectra has a patent pending for the technology employed in its two products, IrisAccelerate and IrisTransactive. These products are designed for zooming and panning and simple image transformations and conversions, respectively. They support 10 file formats and allow developers to add new file formats via their SDK. They do not require the use of Flashpix for images. However, their documentation points out that performance is dependent on the Flashpix format. The system would be very slow if a non-Flashpix format was used.

TrueSpectra allows the image quality and compression to be set for JPEGs only. The compression setting is set on the server and all images are delivered at the same setting.

TrueSpectra has a simple caching mechanism. Images in the cache can be cleared out automatically at certain times and it does not have any dependency features for image propagation. The Web server needs to be brought down in order to update any original assets.

TrueSpectra does not require plug-ins to operate features such as zooming/panning or compositing. The alternative to plug-ins is using their Javascript or active server page technology. These technologies are used by many Web sites to provide interactivity, but not all Web browsers work correctly with these technologies.

TrueSpectra relies on Flashpix as its native file format and does not support media types such as multi-GIFs and sound formats. Flashpix files are typically larger than most file formats. Access to files is faster for zooming and panning, but appears to be quite slow.

The key to IrisTransactive is the compositing subsystem. It requires three things to build a shopping solution using image composition.

1) The original images must be created. It is suggested that the image be converted to Flashpix for better performance.
2) All of the individual images must be described in XML using the image composer program. The program allows the editor to specify anchor points, layer attributes, and layer names. The resulting file is between 5 k and 50 k.
3) The Web designer must place HTML referring to the XML in the Web site. By specifying parameters to the XML, the Web designer can turn on or off layers.

The herein above process for compositing images enables Web designers to create shopping sites. However, a lot of overhead is the result. The XML documents add 5 k-50 k to a Web site. The compositing commands that are embedded in the HTML are difficult to understand. And, because the compositing feature requires several steps to implement, it is not suitable for every image on a Web site. The process seems to be designed for the specific purpose of shopping.

MediaBin™ is limited to activities behind the firewall automating only the "post-creative busywork." In addition, MediaBin requires the use of an application server to function through a web interface. Thus images may not be directly added to any existing web page.

Macromedia's Generator operates by embedding variables in their proprietary Flash format. Therefore the actual imaging operations are somewhat limited and cannot be controlled directly from a web page request.

MGI Software sells point solutions that require end-users to download a viewer to process a proprietary image format.

PictureIQ offers a server-side image-processing appliance that provides a limited set of Photoshop functionalities. This appliance runs on the web-page server, processes information embedded in the web page, and rewrites the web page with image data.

The disclosed prior art fail to provide systems and methodologies that result in a quantum leap in the speed with which they can modify and add images, video, and sound to sites, in the volume of data they can publish internally and externally, and in the quality of the output. The development of such an automated media delivery system would constitute a major technological advance.

It would be advantageous to empower an end user with flexibility and control by providing interactive page capabilities.

It would be advantageous from an end user's perspective to generate Web pages that contain active graphics. For example, clicking on a Corvette image will cause a simple menu to pop up suggesting alternative colors and sizes in which to see the car. Clicking on portions of the image, such as a fender, can call up a close-in view of the fender.

It would be advantageous to provide an automated graphics delivery system that becomes part of the Web site infrastructure and operates as part of the Web page transaction and that thereby provides a less expensive and less time-consuming process.

It would be advantageous to provide a system for automated processing and delivery of media (images, video, and sound) to a Web server whereby it eliminates the laborious post-production and conversion work that must be done before a media asset can be delivered on a Web server.

It would be advantageous to create a dynamic Web site, wherein images are generated on demand from original assets, wherein only the original assets need to be updated, and wherein updated changes propagate throughout the site.

It would be advantageous to provide a system that generates media based on current Web server traffic thereby optimizing throughput of the media through the Web server.

It would be advantageous to provide a system that generates media that is optimized for the Web client, wherein client connection speed determines optimum quality and file size.

It would be advantageous to provide a system that generates media, whereby the media is automatically uploaded.

It would be advantageous to provide a system that automatically caches generated media so identical requests can be handled without regeneration of images.

It would be advantageous to provide a system that resides behind the Web server, thereby eliminating security issues.

It would be advantageous to provide a system wherein the client browser does not require a plug-in.

It would be advantageous to provide a system wherein the system does not require any changes to a Web server.

It would be advantageous to provide a system wherein the system manages the Web server media cache.

It would be advantageous to provide a system wherein the Web media is generated only if requested by a client browser.

It would be advantageous for a system to reduce the need for a Web author to create different versions of a Web site, the system automatically handling image content.

It would be advantageous to provide dynamic imaging capabilities, have a more complete set of image processing functionality, and be controlled directly through an image URL.

It would be advantageous to provide an end-to-end solution requiring only a standard browser that is completely controllable using the proprietary tags contained within a simple image link in the web page.

It would be advantageous to run an image application as a separate server controlled directly by single image requests to that server, such that any web server, even one that is only sending static HTML can access imaging features.

SUMMARY OF THE INVENTION

An automatic graphics delivery system that operates in parallel with an existing Web site infrastructure is provided. The system streamlines the post-production process by automating the production of media through content generation procedures controlled by proprietary tags placed within URLs embedded within Web documents. The author simply places the original media in the system, and adds proprietary tags to the URLs for accessing that media. The system automatically processes the URL encoded tags and automatically produces derivative media for the web site from the original media.

The system takes as input the client connection, server traffic, content generation procedures, and proprietary tags placed within the URL to generate optimized media for the client. The need for the Web author to create different versions of a Web site is reduced because the image content of the site is automatically handled by the system. In addition, generated media is cached such that further requests for the same media require little overhead.

Because the invention takes the original media, content generation procedures, and proprietary URL tags as inputs for generating the Web media, it is possible to modify any of these inputs and have the system automatically update the media on the associated Web pages.

DETAILED DESCRIPTION OF THE INVENTION

An automatic graphics delivery system that operates in parallel with an existing Web site infrastructure is provided. The system streamlines the post-production process by automating the production of media through content generation procedures controlled by proprietary tags placed within URLs embedded within Web documents. The author simply places the original media in the system, and adds proprietary tags to the URLs for accessing that media. The system automatically processes the URL encoded tags and automatically produces derivative media for the web site from the original media.

The system takes as input the client connection, server traffic, content generation procedures, and proprietary tags placed within the URL to generate optimized media for the client. The need for the Web author to create different versions of a Web site is reduced because the image content of the site is automatically handled by the system. In addition, the generated media is cached so that further requests for the same media require little overhead.

Because the invention takes the original media, content generation procedures, and proprietary URL tags as inputs for generating the Web media, it is possible to modify any of these inputs and have the system automatically update the media on the associated Web pages.

A detailed description of such automatic media delivery system operating in parallel with existing Web site infrastructure is found below in the section under the heading as such.

Figure 1:
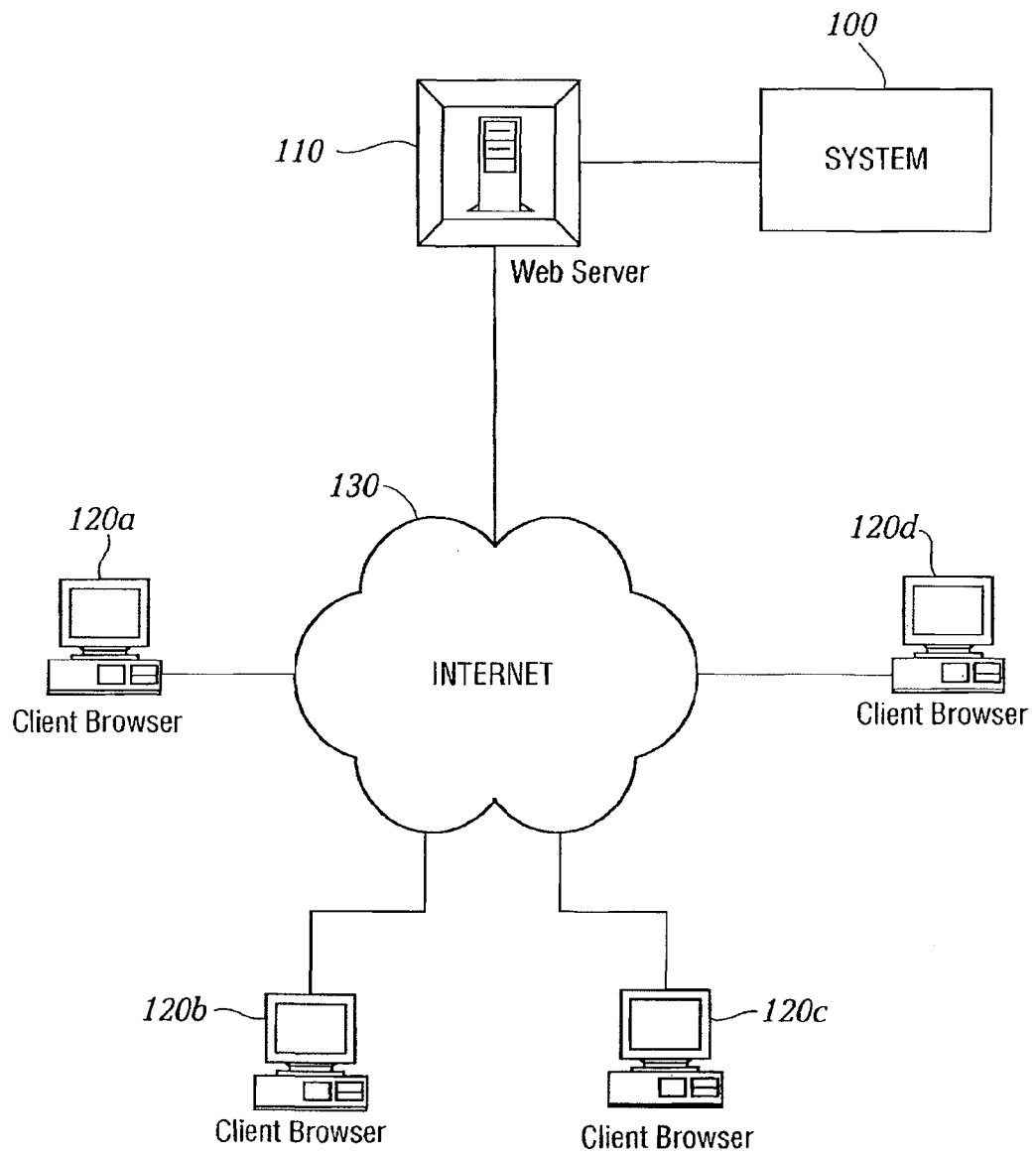
FIG. 1 is a schematic diagram showing the placement of the system within a current Web infrastructure according to the invention.

FIG. 1 is a schematic diagram showing the placement of the system within a current Web infrastructure according to a preferred embodiment of the invention. The system 100 is attached to a Web server 110, which is connected to multiple client browsers 120(a-d) via the Internet 130.

Figure 2:
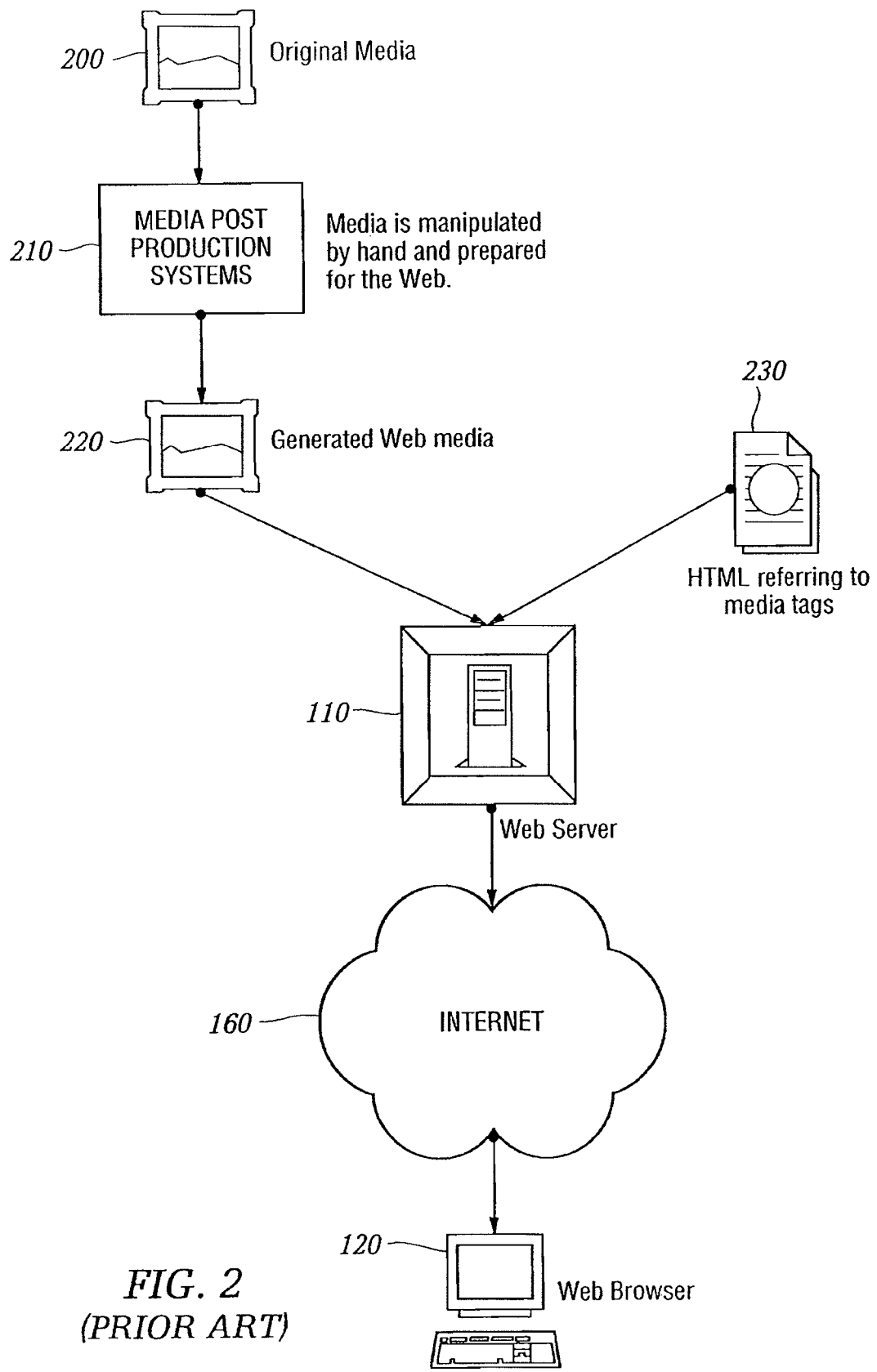
FIG. 2 is a schematic diagram showing how a typical Web site delivers an HTML document and its graphics to a Web browser according to the prior art.

FIG. 2 is a schematic diagram showing how a typical Web site delivers an HTML document and its graphics to a Web browser according to the prior art. An original media 200 is passed to post-production systems 210, wherein the media 200 is manipulated by hand and prepared for the Web. The result is a Web media 220. The Web media 220 and an associated HTML document 230 referring to the media 220 by media tags are input to a Web server 110 for a Web browser 120 to view via the Internet 130.

Figure 3:
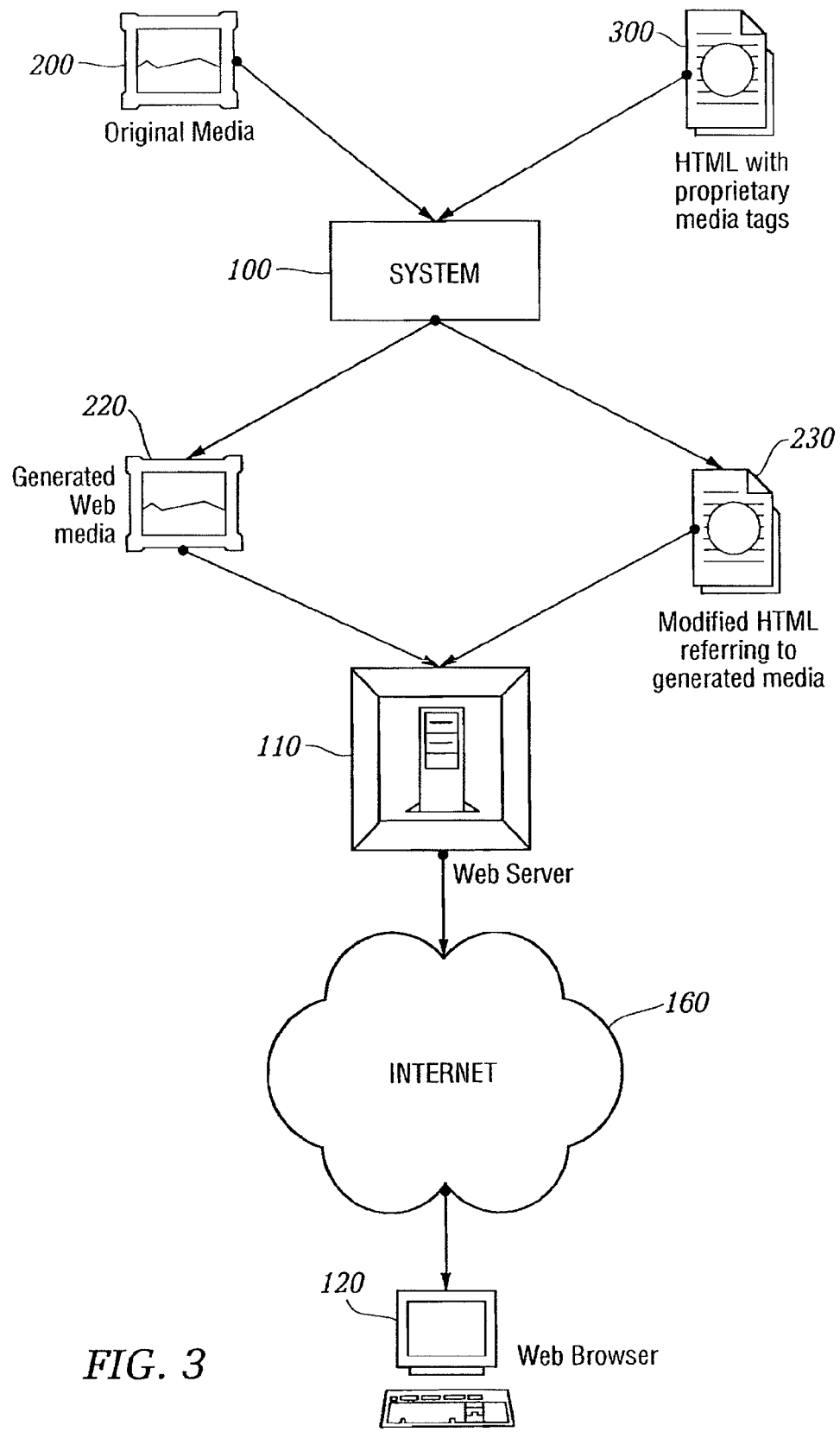
FIG. 3 is a schematic diagram showing delivery of an HTML document and media to a Web browser according to the invention.

FIG. 3 is a schematic diagram showing delivery of an HTML document and media to a Web browser according to a preferred embodiment of the invention. An original media 200 and an HTML document embedded with proprietary media tags 300 are input into the system 100. The system 100 generates a Web-safe media 220 and a modified HTML document 230 that refers to the Web media, and automatically loads them onto the Web server 110 for view by a Web browser 120 via the Internet 160.

Figure 4:
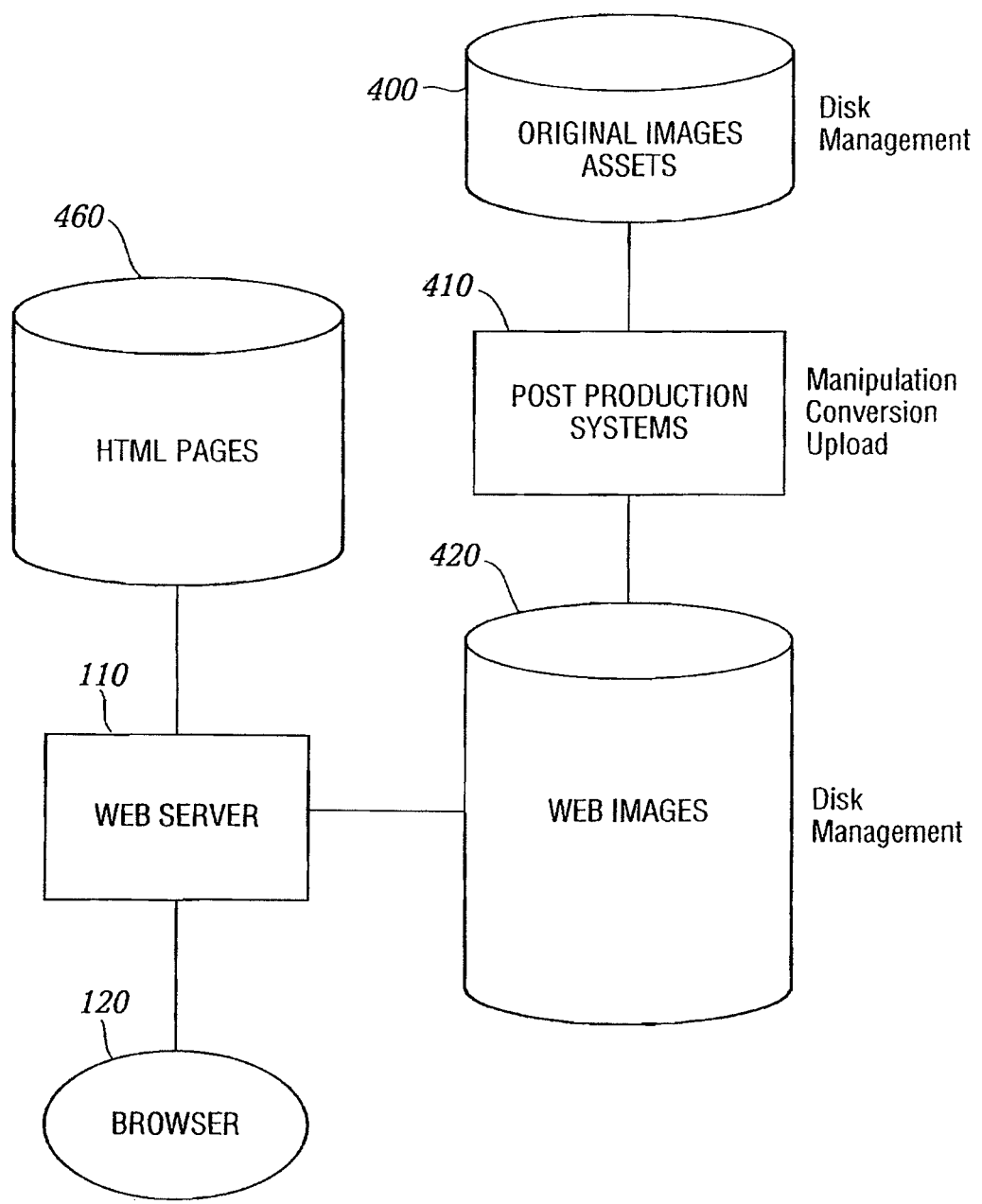
FIG. 4 is a schematic diagram showing the components involved in Web site administration according to the prior art.

FIG. 4 is a schematic diagram showing components involved in Web site administration according to the prior art. Original media assets 400 are original images, video, or sound that have not been prepared for the Web. Web sites usually need to manage the placement of media on the network for easy retrieval by Web designers. Post-production systems 410 vary from Web site to Web site.

Post-production systems 410 are usually custom procedures that Web designers use to convert an original media, such as an image, to one that can be displayed on the Web. Post-production systems 410 also upload finished images to Web image systems. Web images 420 are Web versions of the original images. Web images 420 are ready for retrieval by the Web server 110 to be delivered to a Web browser 120. Any image to be modified or updated must pass through the herein above three components before it can be delivered to the Web browser 120. HTML pages 460 have references to Web images 420.

Figure 5:
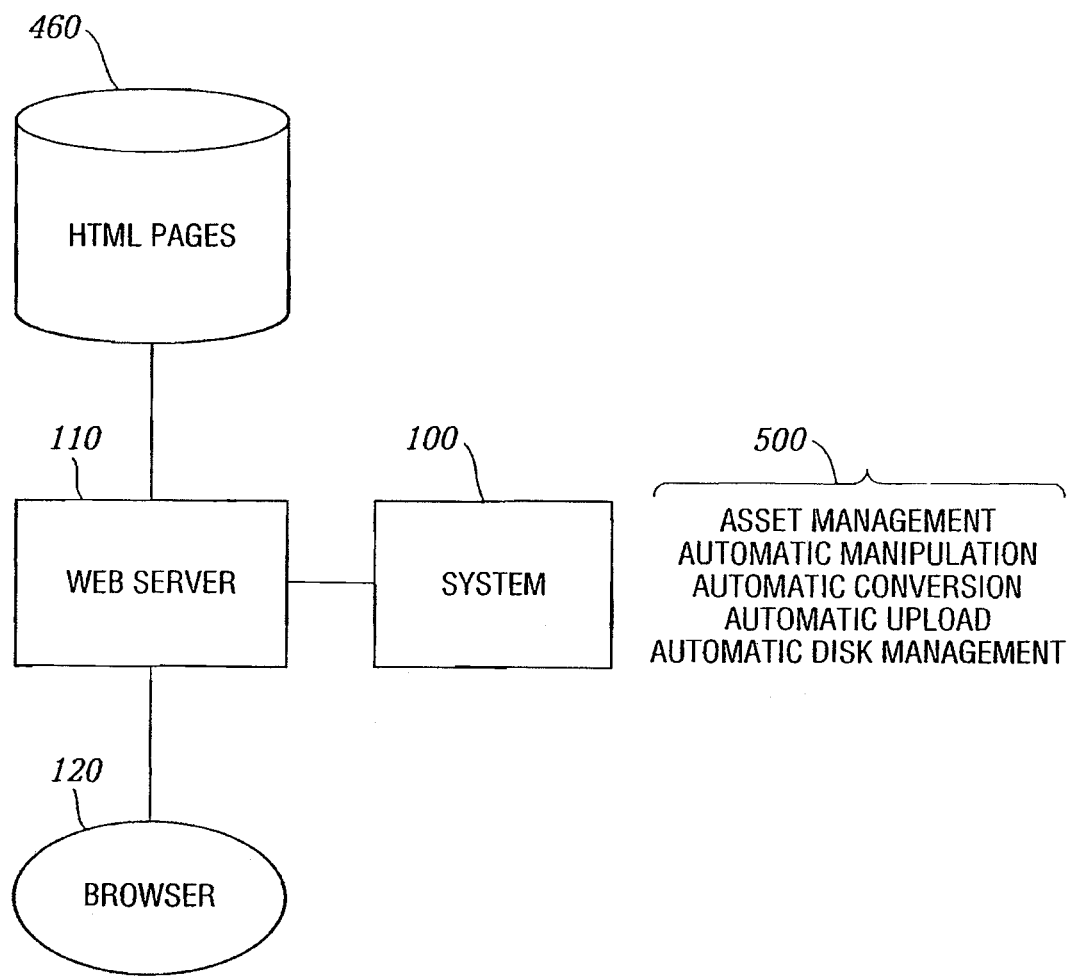
FIG. 5 is a schematic diagram showing the components of the system involved in Web site administration according to the invention.

FIG. 5 is a schematic diagram showing the components involved in Web site administration according to a preferred embodiment of the invention. Web site administration is simplified using the claimed invention. Asset management, automatic image manipulation, automatic image conversion, automatic image upload, and automatic disk management 500 are provided by the claimed invention.

Figure 6:
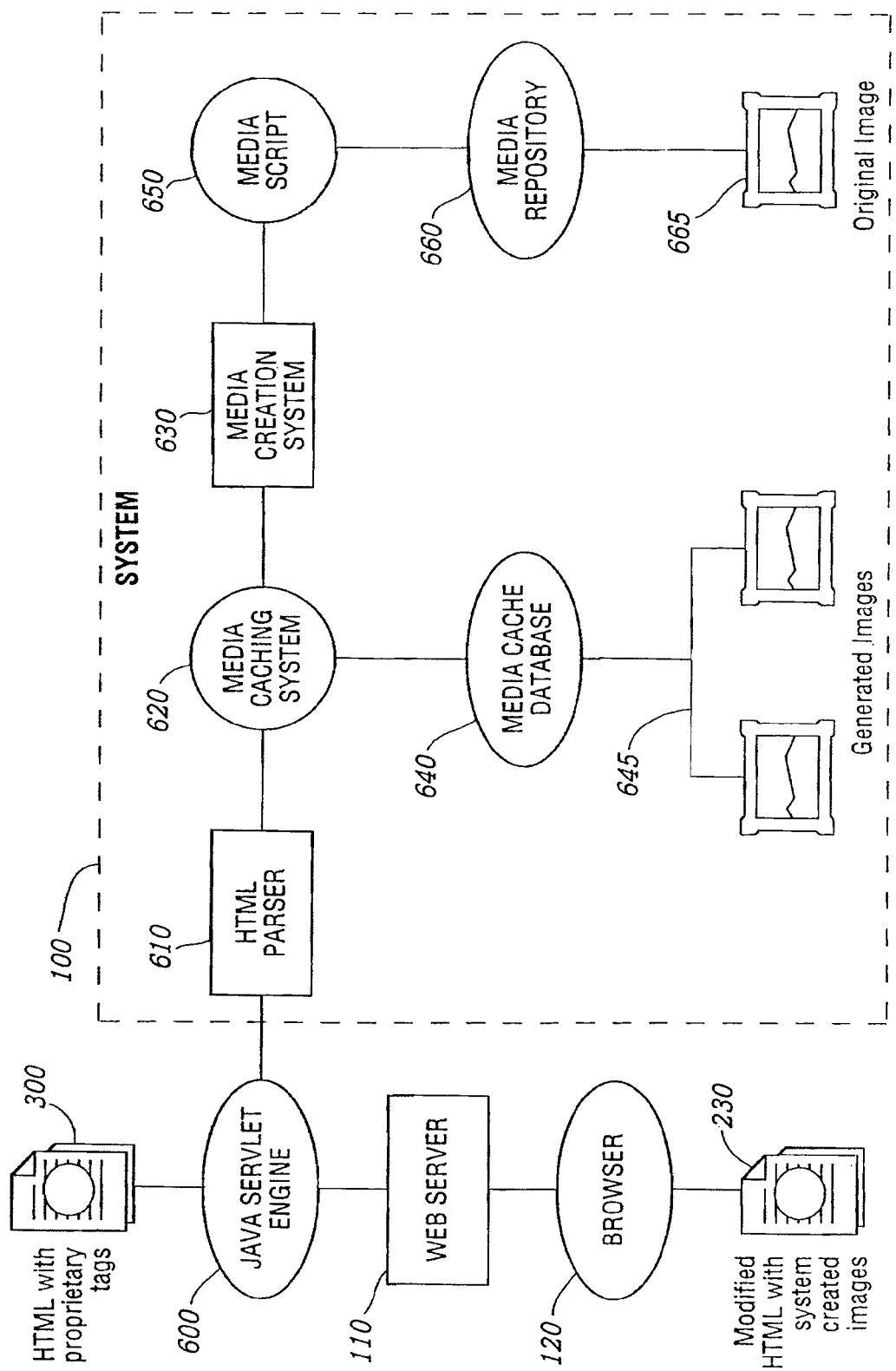
FIG. 6 is a simple overview showing the components of the system according to the invention.

FIG. 6 is a simple overview showing the components of the system according to a preferred embodiment of the invention. HTML with proprietary tags 300 is the original HTML document that is embedded with proprietary tags which describe how the images are to be manipulated for the Web. Java servlet engine 600 is a third-party product that allows the system 100 to interface with the Web server 110 and execute Java servlet code. The Web server 110 is third-party software that delivers Web pages to a Browser 120. The Browser 120 views Web pages that are sent from the Web server 110. Modified HTML with system created images 230 are a final result of the system. Modified HTML 230 is a standard HTML document without proprietary embedded tags and with standard Web graphics.

The System.

A preferred embodiment of the system 100 is provided.

HTML parsing subsystem 610 parses through an HTML document and searches for proprietary tags. If it finds a proprietary tag it hands it to a media caching subsystem 620 for further processing. The media caching subsystem 620 returns a standard HTML tag. The HTML parsing subsystem 610 then replaces the proprietary tag it found with the returned tag. The parsing subsystem 610 then continues searching for a next proprietary tag, repeating the process herein above. The process is finished when no more proprietary tags can be found.

The media caching subsystem 620 determines if an image has been created for the requested proprietary tag. If the image has already been created and the files that built that image have not been modified, the media caching subsystem 620 returns an HTML tag that refers to a previously-generated image. If the image has not been created, the media caching subsystem 620 hands the HTML tag to a media creation subsystem 630. The media creation subsystem 630 returns an image to the media caching subsystem 620. The media caching subsystem 620 adds the created image and the HTML tag to a media cache database 640.

The media cache database 640 contains references to the created images 645. In a preferred embodiment, the references are the script used to create the image, the names of the images used to create the image, the dates of those files, and the HTML that represents the created image. The media caching subsystem 620 performs lookups in this database to determine if the image has been created. If the image has not been created the media caching subsystem 620 calls upon the media creation subsystem 630 to create the image and then store the results in the media cache database 640.

The media creation subsystem 630 takes a proprietary tag from the media caching subsystem 620 and generates an image. The image is generated by deciphering the tag and handing it to the media processing engine 650. After the image is created, the media creation subsystem returns the name of the newly created image to the media caching subsystem 620.

The media processing engine 650 interprets the proprietary tag and generates the image. The media processing engine 650 looks up images in a media repository to obtain the location of the original file.

The media repository 660 contains original images 665 used in the system 100.

Figure 7:
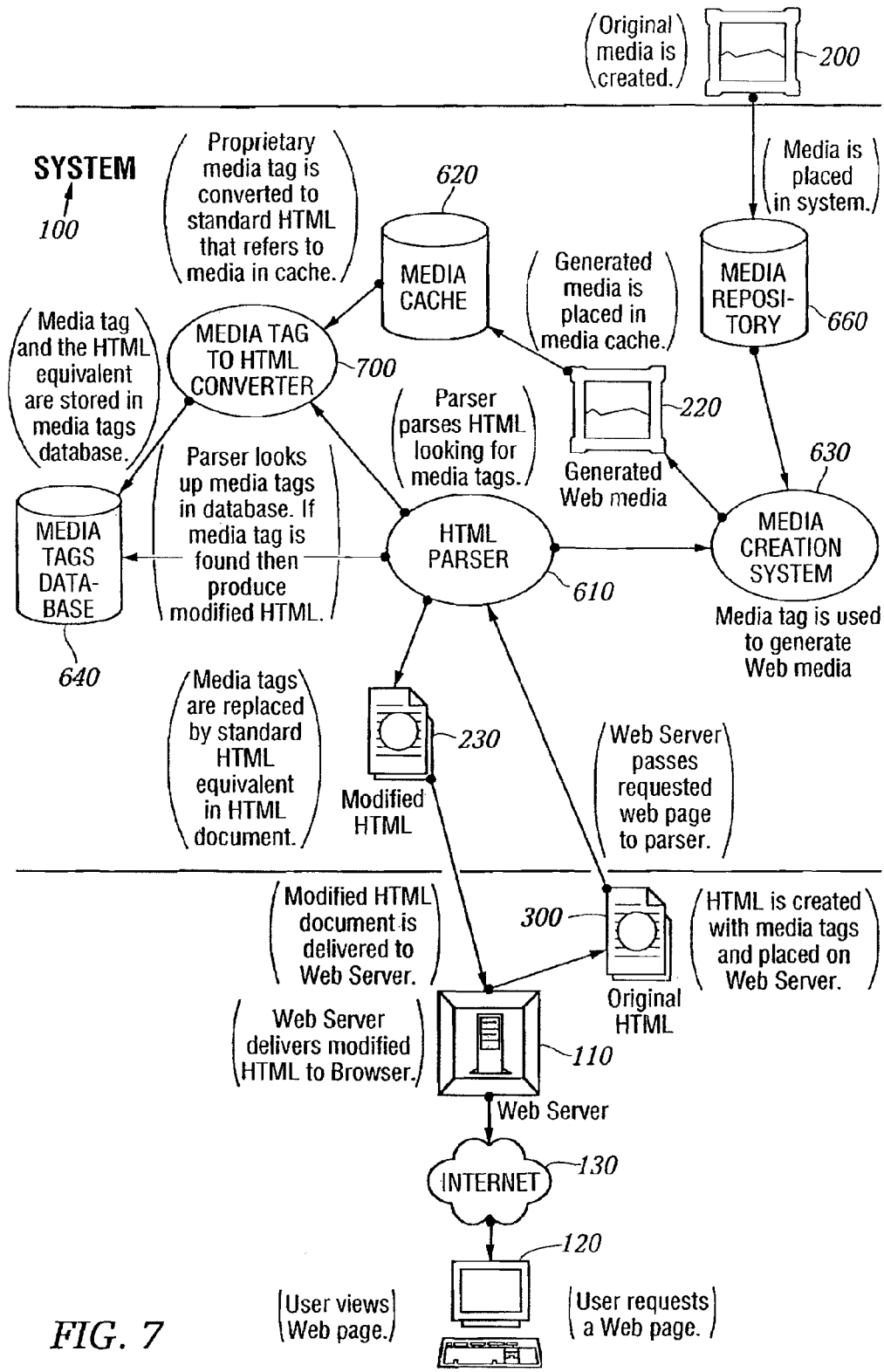
FIG. 7 is a schematic diagram showing the process flow of a proprietary enabled page delivered to a Web browser according to the invention.

FIG. 7 is a schematic diagram showing the process flow of a proprietary enabled page delivered to a Web browser according to a preferred embodiment of the invention. An original media 200 is created. The media 200 is placed into the system 100 in the media repository 660. Similarly, an HTML document with proprietary tags 300 is created and placed on a Web server 110. A user requests a Web page from a Web browser 120. The Web server 110 passes the requested page to an HTML parser 610. The HTML parser 610 parses HTML looking for media tags. The parser 610 looks up media tags in a media tags database 640. If the media tag is found, then the system 100 produces a modified HTML document 230. Otherwise, the media creation subsystem 630 uses the media tag to generate a Web media 220. The generated Web media 220 is placed in a media cache subsystem 620. The proprietary media tag is converted by a converter 700 to a standard HTML tag that refers to the generated media 220 in cache. The media tag and the HTML equivalent are stored in the media tags database 640. Media tags are replaced by standard HTML equivalent to provide a modified HTML document 230. The modified HTML document 230 is delivered to the Web server 110. The Web server 100 delivers the modified HTML document 230 to the browser 120 via the Internet for a user to view.

Figure 8:
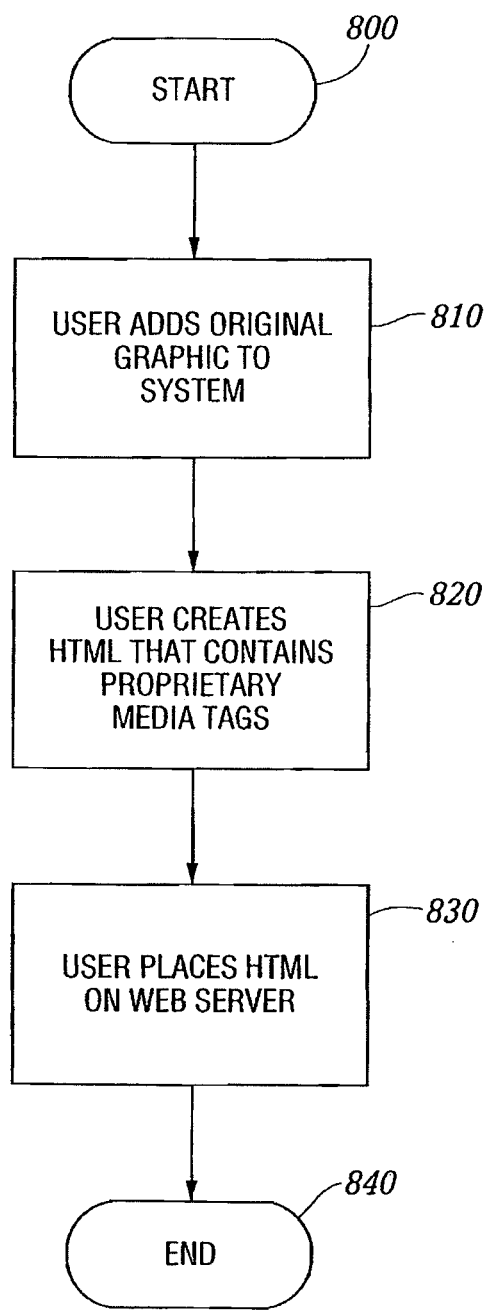
FIG. 8 is a flow chart showing an authoring process according to the invention.

FIG. 8 is a flow chart showing an authoring process according to a preferred embodiment of the invention. The process starts (800) when a user adds an original graphic to the system (810). The user then creates an HTML document that contains proprietary media tags (820). The user then places the HTML document on a Web server (830) and ends the authoring process (840).

Figure 9:
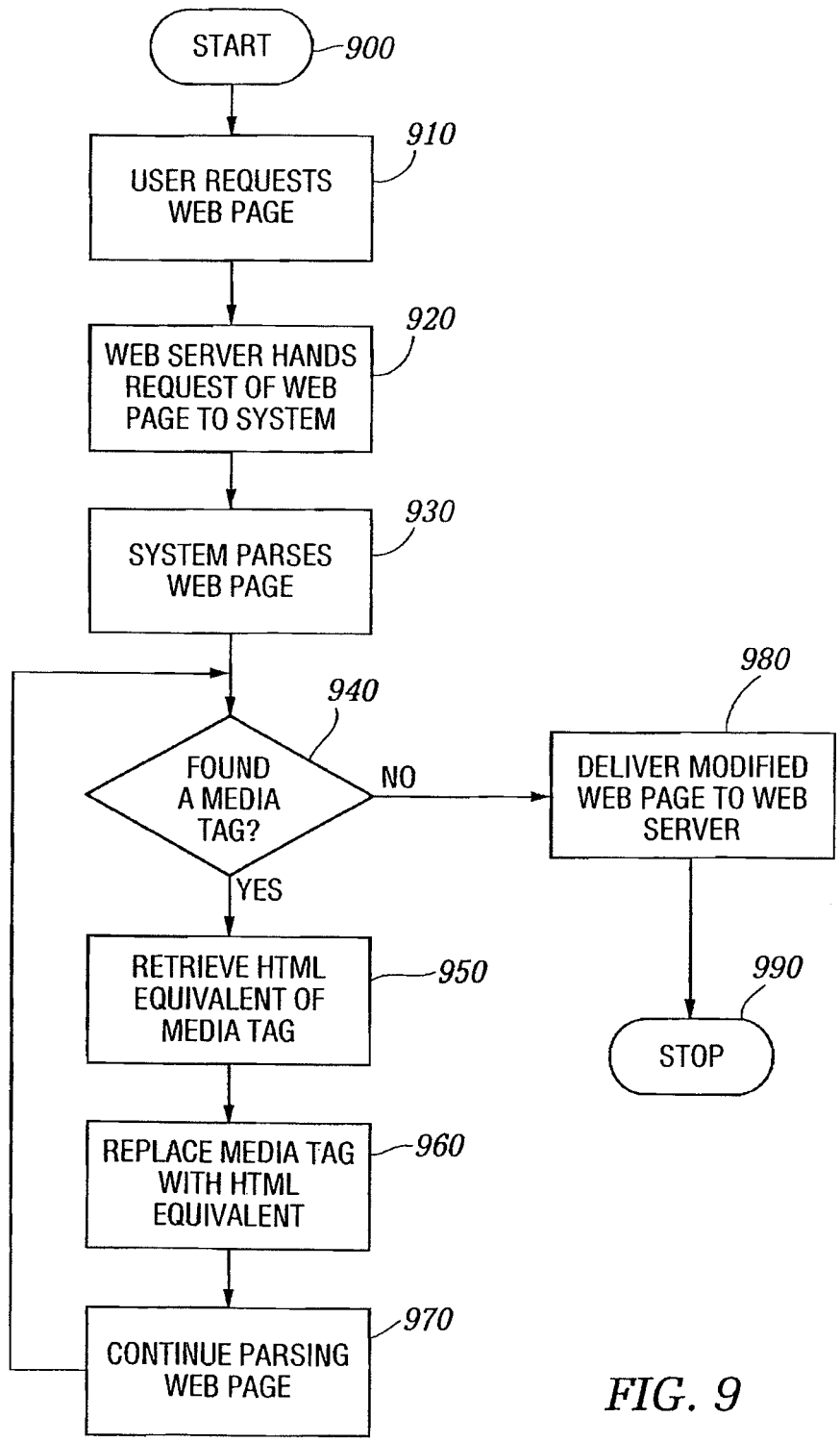
FIG. 9 is a flow chart showing an HTML parsing process according to the invention.

FIG. 9 is a flow chart showing an HTML parsing process according to a preferred embodiment of the invention. The process starts (900) when a consumer requests a Web page (910). A Web server hands the request of the Web page to the system (920). The system parses the Web page (930). The system looks for a media tag (940). If found, the system retrieves the HTML equivalent of the media tag (950) and replaces the media tag with the HTML equivalent tag (960). The system continues parsing the Web page for tags (970) by returning to step (940). When no more tags are found, the system delivers the modified Web page to the Web server (980) and therein ends the process (990).

Figure 10:
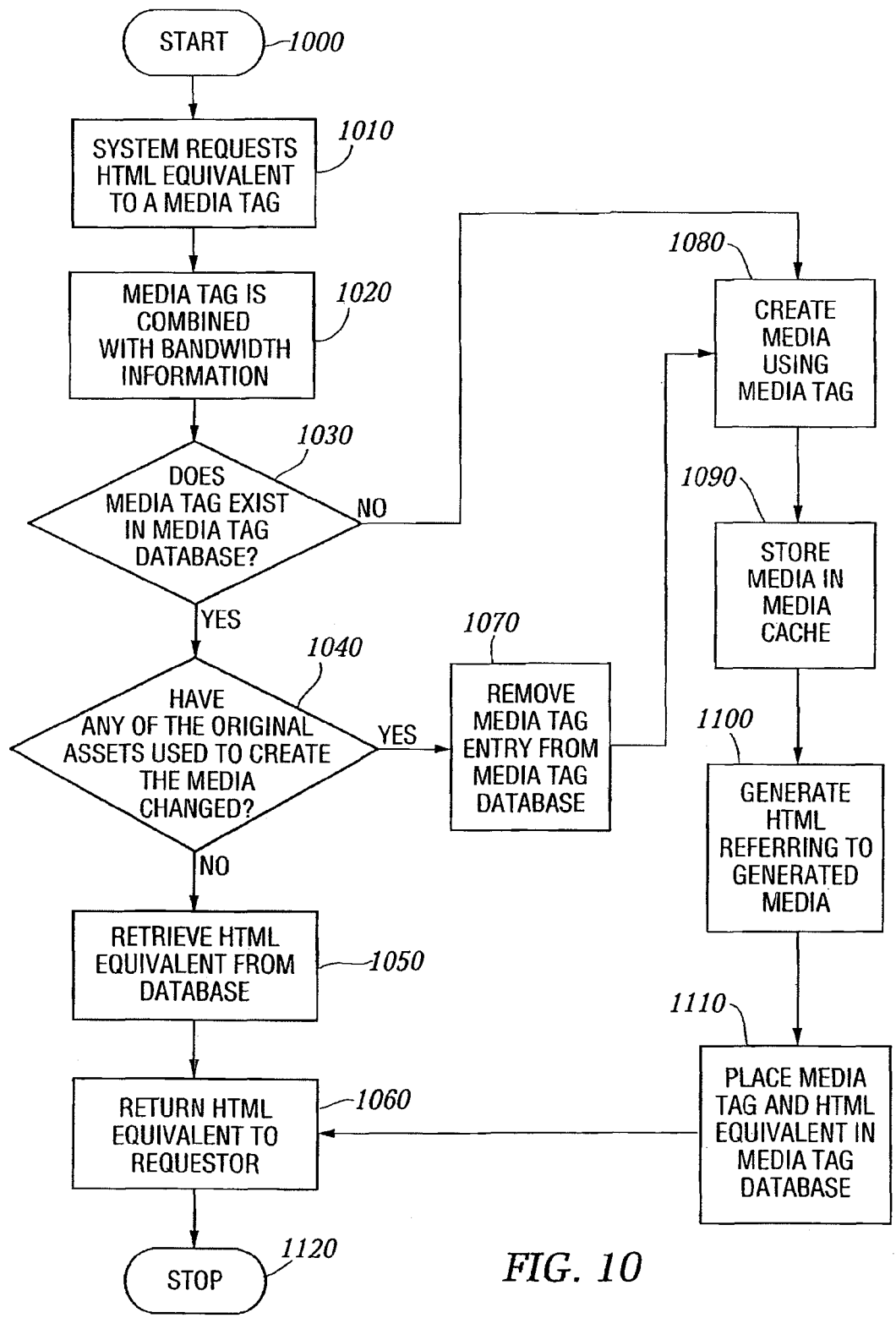
FIG. 10 is a flow chart showing a media creation process according to the invention.

FIG. 10 is a flow chart showing a media creation process according to a preferred embodiment of the invention. The process starts (1000) when the system requests an HTML equivalent to a proprietary media tag (1010). The Media tag is combined with bandwidth information (1020). The subsystem checks if the media tag already exists in the media tag database (1030). If it does, the subsystem checks if any of the original assets used to create the media have been changed (1040). If not, then the subsystem retrieves the HTML equivalent tag from the database (1050) and returns the HTML equivalent tag to the requesting system (1060). If any of the original assets used to create the media have been changed (1040), then the subsystem removes the media tag entry from the media database (1070) and creates the media using the media tag (1080). The subsystem then stores the media in a media cache (1090). The subsystem generates the HTML referring to the generated media (1100) and places the media tag and the HTML equivalent in the media tag database (1110). The HTML equivalent is returned to the requesting system (1060) and the process stops (1120).

The differences between using HTML and the proprietary tags disclosed herein are noted. HTML allows Web designers to create Web page layouts. HTML offers some control of the images. HTML allows the Web designer to set the height and width of an image. However, all of the other image operations disclosed herein are supported by the claimed invention and are not supported by HTML.

Table A herein below provides the claimed proprietary tags according to a preferred embodiment of the invention. The use of the term "freeride" refers to an internal code name for the invention.

TABLE A

| Tags |
|---|
| Generate image |
| <freerideimage> mediascript </freerideimage> |
| Generate a standard Web image. |
| Generate thumbnail image linked to full image |
| <freerideimagethumbnail> mediascript <xs=size ys=size / freerideimagethumbnail> |
| Generate a thumbnail of specified size and link it to the full size version. |
| Generate zoom and pan image |
| <freerideimagezoom> mediascript </freerideimagezoom> |
| Generate a zoomable/panable image. |
| Security |
| <freerideimagesecure> </freerideimagesecure> |
| Specifies that all images found between these tags are secured images and the system will determine access before generating. |

Table B herein below provides the claimed script commands according to a preferred embodiment of the invention. Additional commands may be added as needed.

TABLE B

| Media processing script commands |
|---|
| Add Noise |
| Noise_AddNoise( [amount=<value 1..999>] [gaussian] [grayscale] ) |
| This command adds noise to the image. |
| Adjust HSB |
| AdjustHsb([hue @ <value ±255>] [saturation @ <value ±255>] [brightness @ <value ±255>]) |
| This command allows the HSB of an image to be altered. This can be applied to images of all supported bit-depths. |
| Adjust RGB |
| AdjustRgb( [brightness @ <value ±255>] [contrast @ <value ±255>] [red @ <value ±255>] [green @ <value ±255>] [blue @ <value ±255>] [noclip @ <true, false>] [invert @ <true, false>] ) |
| This command allows the contrast, brightness, and color balance of an image to be altered. |
| Blur |
| Blur( radius @ <value 0..30>) |
| This command applies a simple blur filter on the image. |

TABLE B-continued

Media processing script commands

Blur Convolve
Blur_Blur( )
This command commands perform a simple 3×3 convolution for blurring.
Blur Convolve More
Blur_MoreBlur( )
This command commands perform a stronger 3×3 convolution for blurring.
Blur Gaussian
Blur_GaussianBlur( [radius=<value 0.1..250>] )
This command applies a Gaussian blur to the image.
Blur Motion
Blur_MotionBlur( [distance=<value 1..250>] [angle=<degrees>] )
This command applies motion blurring to the image using the specified distance and
angle.
Brush Composite
Composite( source @ {<User-Defined Media Object name>} [x @ <pixel>] [y @ <pixel>]
[onto] [opacity @ <value 0..255>] [color @ <color in hexadecimal>] [colorize @ <true, false>]
[saturation @ <value 0..255>] )
This command composites the specified "brush" (foreground) image onto the
current "target" (background) image.
Colorize
Colorize( color @ <color in hexadecimal> [saturation @ <value 0..255>] )
This command changes the hue of the pixels in the image to the specified color.
Convert
Convert( rtype @ <bit-depth> {dither @ <value 0..10>] )
This command converts the image to the specified type/bit-depth.
Convolve
Convolve( Filter @ <filtername> )
This command applies a basic convolution filter to the image. In a user interface driven
system, the filters could be stored in files and edited/created by the user.
Crop/Resize Canvas
Crop( [xs @ {<pixels>, <percentage + "%">}] [ys @ {<pixels>, <percentage + "%">}] [xo @ <left
pixel>]
[yo @ <top pixel>] [padcolor @ <color in hexadecimal>] [padindex @ <value 0..255>] )
This command crops the media to a specified size.
Discard
Discard( )
This command removes the designated Media Object from memory.
Drop Shadow
DropShadow( [dx @ <pixels>] [dy @ <pixels>] [color @ <color in hexadecimal>] [opacity @ <value
0..255>] [blur @ <value 0..30>] [enlarge @ <true, false>])
This command adds a drop shadow to the image based on its alpha channel.
Equal
Equal( source @ {<User-Defined Media Object name>})
This command compares the current media with the one specified. If the media are
different in any way, an error value is returned.
Equalize
Equalize( [brightness @ <−1, 0..20>] [saturation @ <−1, 0..20>])
This command equalizes the relevant components of the media. Equalization takes the
used range of a component and expands it to fill the available range.
Export Channel
ExportGun( Channel @ <channelname> )
This command exports a single channel of the source as a grayscale image.
Find Edges
Stylize_FindEdges( [threshold=<value 0..255>] [grayscale] [mono] [invert] )
This command finds the edges of the image based on the specified threshold value.
Fix Alpha
FixAlpha( )
This command adjusts the RGB components of an image relative to its alpha channel.
Flip
Flip( <horizontal, vertical> @ <true, false> )
This command flips the media vertically or horizontally.
Frame Add
FrameAdd( Source @ <filename> )
This command adds the given frame(s) to the specified Media Object.
Glow/Halo
Glow( Size @ <value 0..30> [halo @ <value 0..size>] [color @ <color in hexadecimal>]
[opacity @ <value 0..255>] [blur @ <value 0..30>] [enlarge @ <true, false>] )
This command produces a glow or halo around the image based on the image's alpha.
High Pass
Other_HighPass( [radius=<value 0.1..250>] )
This command replaces each pixel with the difference between the original pixel and a
Gaussian blurred version of the image.
Import Channel
ImportGun( channel @ <channel name> source @ {<User-Defined Media Object name>}
[rtype @ <bit-depth>])
This command imports the specified source image (treated as a grayscale) and replaces
the selected channel in the original.
Load TABLE B-continued Media processing script commands Load( Name @ <filename> [type @ <typename>] [transform @ <true, false>] )
This command loads a media from the specified file.
Maximum
Other_Maximum( [radius=<value 1..10>] )
This command scans the area specified by the radius surrounding each pixel, and then
replaces the pixel with the brightest pixel found.
Minimum
Other_Minimum( [radius=<value 1..10>] )
This command scans the area specified by the radius surrounding each pixel, and then
replaces the pixel with the darkest pixel found.
Normalize
Normalize( [clip @ <value 0..20>] )
This command expands the volume of the sample to the maximum possible.
Pixellate Mosaic
Pixellate_Mosaic( [size=<value 2..64>] )
This command converts the image to squares of the specified size, where each square
contains the average color for that part of the image.
Pixellate Fragment
Pixellate_Fragment( [radius=<value 1..16>] )
This command produces four copies of the image displaced in each direction (up, down,
left, right) by the specified radius distance and then averages them together.
Quad Warp
QuadWarp( [tlx=<position>] [tly=<position>] [trx=<position>] [try=<position>] [blx=<position>]
[bly=<position>] [brx=<position>] [bry=<position>] [smooth] )
This command takes the corners of the source image and moves them to the specified
locations, producing a warped effect on the image.
Reduce to Palette
Reduce( [colors @ <num colors>] [netscape @ <true, false>] [b&w @ <true, false>]
[dither @ <value 0..10>] [dithertop @ <value 0..10>] [notbackcolor] [pad @ <true, false>] )
This command applies a specified or generated palette to the image.
Rotate
Rotate( Angle @ <value 0..359> [smooth @ <true, false>] [enlarge @ <true, false>] [xs @
<pixels>]
[ys @ <pixels>] )
This command rotates the media by the specified angle in degrees.
Rotate 3D
Rotate3d( [anglex @ <angle ±89>] [angley @ <angle ±89>] [distance @ <value>] )
This command rotates the image in 3D about either the x-axis or y-axis.
Save
Save([type @ <image-type>])
This command saves a media to the specified file.
Scale
Scale( [xs @ {<pixels>, <percentage + "%">}] [ys @ {<pixels>, <percentage + "%">}]
[constrain @ <true, false>] [alg @ {"fast", "smooth", "outline"}] [x1 @ <pixels>] [y1 @ <pixels>]
[x2 @ <pixels>] [y2 @ <pixels>] )
This command scales the image to the specified size.
Select
Selection( [source @ <User-Defined media Object>}] [remove @ <true, false>] [invert @ <true,
false>]
[backcolor] [color=<color>] [index=<value>] [opacity @ <value 0..255>] )
This command manages the selected region for the current Media Object.
Set Color
SetColor( [backcolor @ <color in hexadecimal>] [forecolor @ <color in hexadecimal>]
[backindex @ <value 0..255>] [foreindex @ <value 0..255>] [transparency @ ("on","off")] )
This command allows the background color, foreground color, and transparency state of
an image to be set.
Set Resolution
SetResolution( [dpi @ <value>] [xdpi @ <value>] [ydpi @ <value>] )
This command changes the DPI of the image in memory.
Sharpen
Sharpen_Sharpen( )
This command sharpens the image by enhancing the high-frequency component of the
image.
Sharpen More
Sharpen_SharpenMore( )
This command sharpens the image by enhancing the high-frequency component of the
image, but is stronger than the standard sharpening.
Stylize Diffuse
Stylize_Diffuse( [radius=<value 0..>] [lighten] [darken] )
This command diffuses the image by randomizing the pixels within a given pixel radius.
Stylize Emboss
Stylize_Emboss( [height=<value 1..10>] [angle=<degrees>] [amount=<percentage 1..500>])
This command converts the image to an embossed version.
Text Drawing
DrawText( Text @ <string> Font @ <font file> [size @ <value>]
[color @ <color in hexadecimal>] [smooth @ <true, false>] [<left, right, top, bottom> @ <true,
false>]
[x @ <pixel>] [y @ <pixel>] [wrap @ <pixel-width>] [justify @ {left,center,right}] [angle @ <angle>])

TABLE B-continued

Media processing script commands

This command composites the specified text string onto the image.
Text Making
MakeText( text @ <string> font @ <font file> [path @ <path to font directory>] [size @ <value 1..4095>]
[color @ <color in hexadecimal>] [smooth @ <true, false>] [wrap @ <pixel-width>]
[justify @ {left,center,right}] [angle @ <angle>] )
This command creates a new image that includes only the specified text.
Trace Contour
Stylize_TraceContour( [level=<value 0..255>] [upper] [invert] )
This command traces the contour of the image at the specified level (for each gun).
Unsharpen Mask
Sharpen_UnsharpMask( [amount=<percentage 1..500>] [radius=<value 0.1..250>]
[threshold=<value 0..255>] )
This command enhances the edges and detail of an image by exaggerating differences between the image and a gaussian blurred version of the same image.
Zoom
Zoom( [xs @ <pixels>] [ys @ <pixels>] [scale @ <value>] [x @ <left pixel>] [y @ <top pixel>] )
This command zooms in on a specified portion of the media and fits it to the specified size. This constitutes a crop followed by a scale.

Table C herein below provides a list of features provided by a preferred embodiment of the invention. It is noted that the list of features included in Table C is by no means complete. In other embodiments, the list of features is expanded or reduced as needed.

TABLE C

System Feature List

Reads and writes various file formats:
BMP, GIF, JPG, PNG, TIF, PICT, TGA, PSD, FPX;
Supports many image processing operations;
Dynamically creates Web images from original assets;
Dynamically creates thumbnail images;
Dynamically creates images that can be panned and zoomed without browser plug-ins or special file formats;
Automatically propagates changes of original assets throughout a Web site;
Uses an intelligent caching mechanism:
Clean up image cache on demand;
Eliminates orphaned image files; and
Optimizes Web server cache by providing most recent images;
Renders TrueType fonts on the server instead of browser;
Uses intelligent scaling of line drawings;
Allows Web designers to manipulate images with proprietary tags;
Preserves original image assets;
Optimizes Web server traffic by adjusting the bandwidth of graphics;
Optimizes images for client connection speed;
Allows clients to specify the quality of images on a Web site; and
Allows Web designers to dynamically create images by manipulating proprietary tags in their applications (server or client side).

Figure 11:
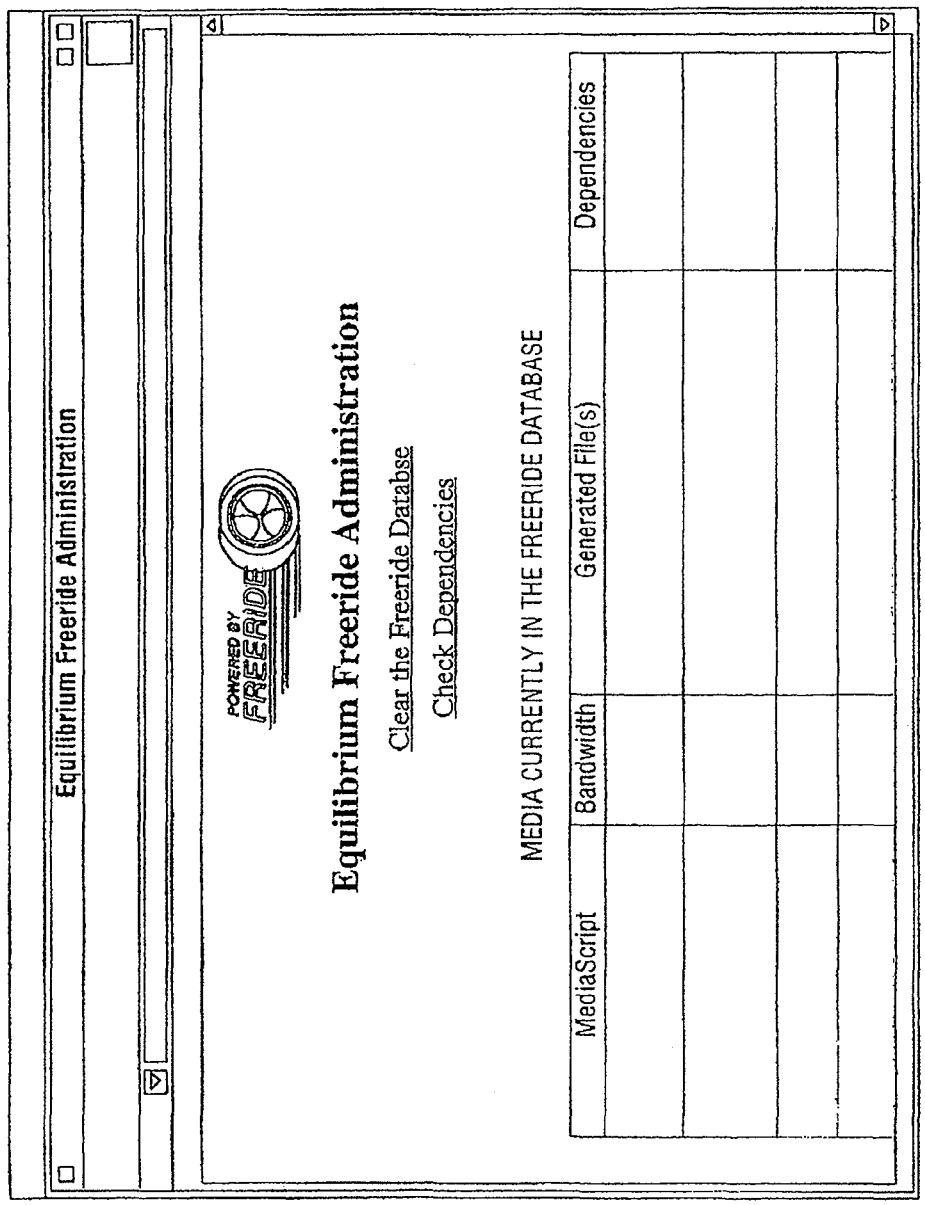
FIG. 11 is a screen shot showing an administration tool according to the invention.

FIG. 11 is a screen shot showing an administration tool according to a preferred embodiment of the invention. Specifically, FIG. 11 shows an administration page that contains cached images of generated scripts. The use of the term "freeride" refers to an internal code name for the invention.

Figure 12:
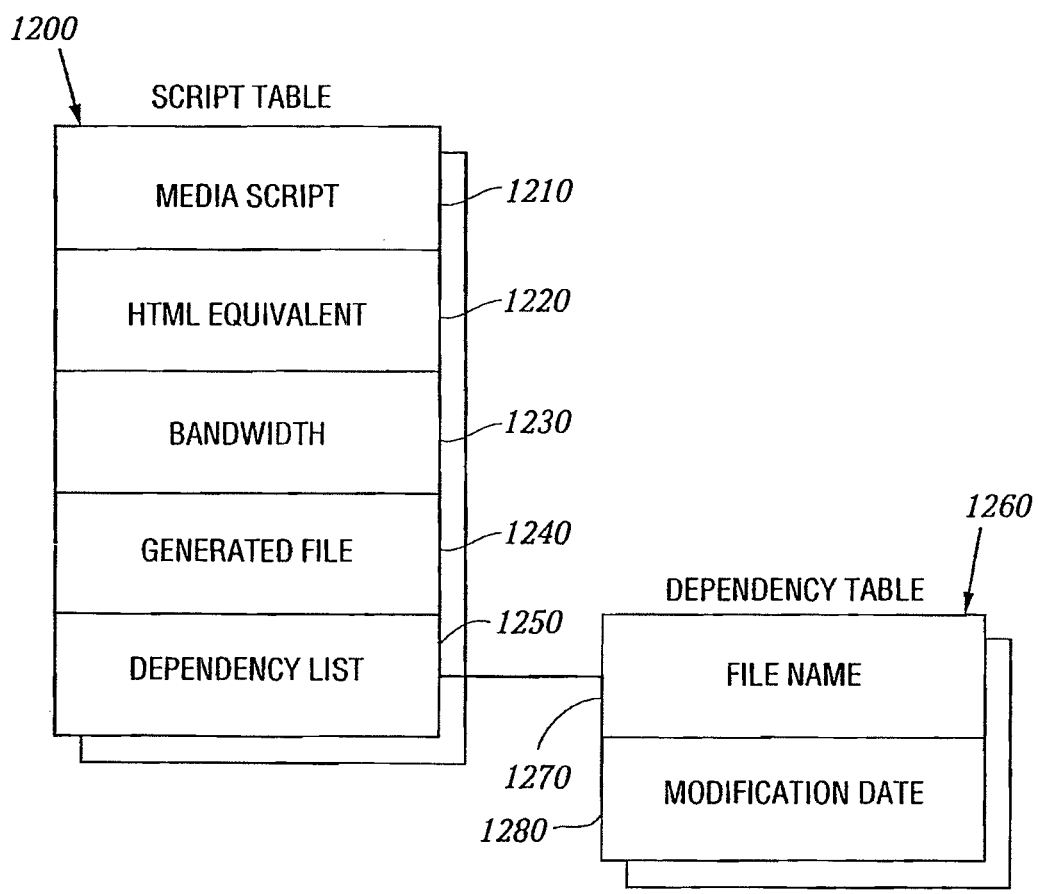
FIG. 12 displays a structure of a database record used for the system according to the invention.

FIG. 12 displays a structure of a database record used for the system according to a preferred embodiment of the invention. A Script Table 1200 has 5 columns, Media Script 1210, HTML Equivalent 1220, Bandwidth 1230, Generated File 1240, and Dependency List 1250. A Dependency Table 1260 has two columns, File Name 1270 and Modification Date 1280.
Snowboard Store Example.
Background.

The snowboard store highlights several features of the claimed system. The snowboard store is an imaginary store that allows a user to configure his or her snowboard. The store consists of five logos, five board colors, and four boards. The consumer clicks on the buttons to change the snowboard represented in the middle of the screen. When the consumer has configured the snowboard they the snowboard can be purchased by selecting a buy button.
Prior Art Method.

To create the snowboard site today, the Web designer must render all possible combinations of the board. The number of combinations is five logos×five board colors×four boards=100. The designer also must render all the buttons. The creation process is very tedious and involves a lot of production work. Typically, most Web sites do not even attempt such an endeavor. Also, other issues must be addressed, such as, for example, updating the Web site and scripting. For example, updating a single logo involves updating a minimum of 20 images.

The prior art method sustains a graphic intensive site that requires management of at least 100 images. Updates to the Web site are time-consuming and prone to human error.
The Claimed Method.

A preferred embodiment of the method scripts the image creation process in HTML to create a dynamic Web site. There is no need to create over 100 images. The claimed system generates images on demand. The Web site only needs to create original assets. The scripting process involves writing the proprietary scripts. In the current example herein, scripting buttons is very simple. Once one button is created, simply copy and paste the HTML to create another button or many buttons. Only the name of the image to be overlaid on the button must be changed. The Webmaster then creates a simple program that reads what object a user has clicked on and generates a proprietary tag. The tag is then sent to the claimed system to generate a center image.

The claimed method allows the creation of all 100 combinations automatically. When the Web site receives an updated image, only the original image needs to be updated. Any change to the original image automatically propagates throughout the system. The Web site is easier to manage. Testing of the Web site is easier because there is no need to test all 100 combinations. A small subset of combinations will guarantee adequate coverage.
Processing of an Image Tag Example (FIG. 13-16).

Figure 13:
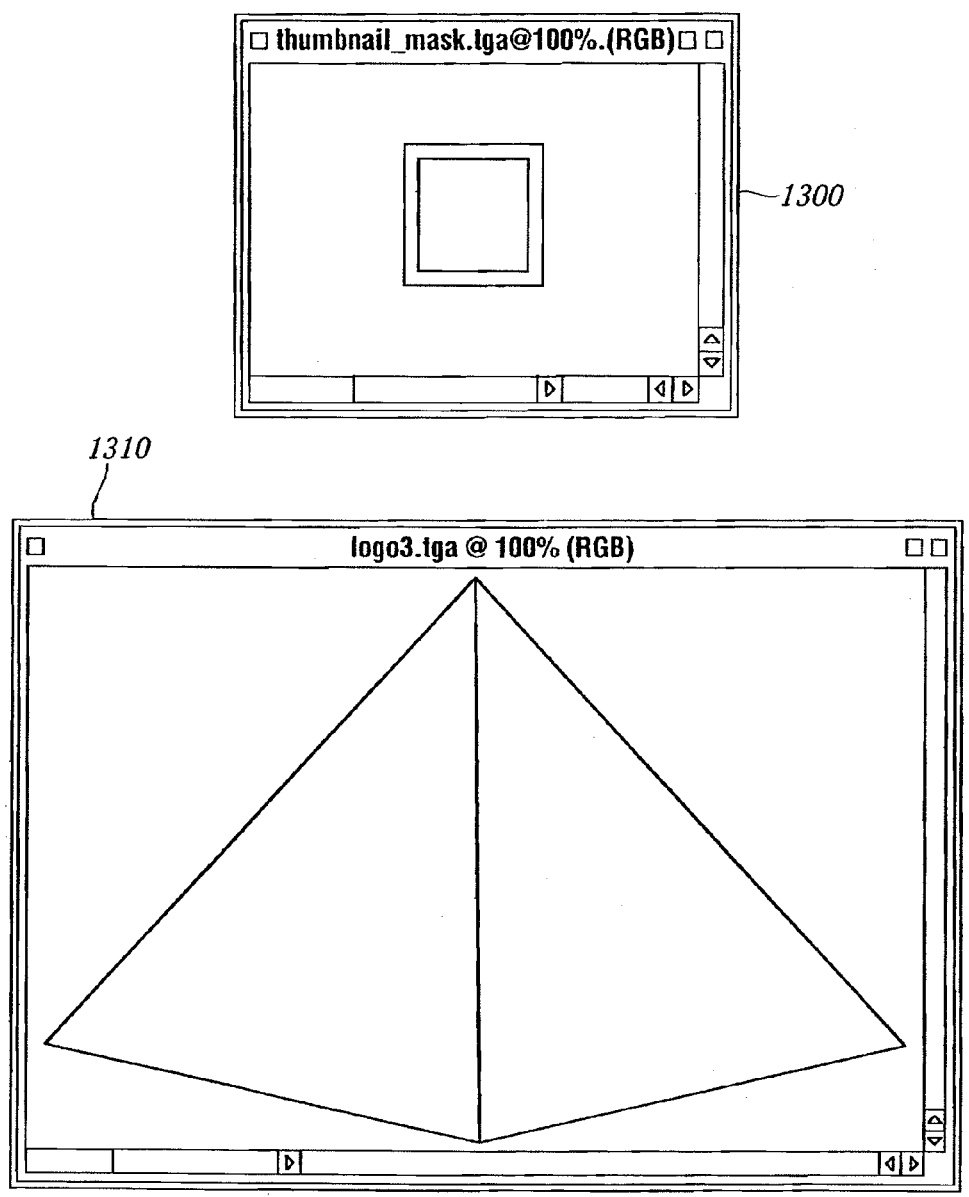
FIG. 13 shows original media to be processed according to the invention.

FIG. 13 shows two original images 1300 and 1310 to be processed according to a preferred embodiment of the invention.

Figure 14:
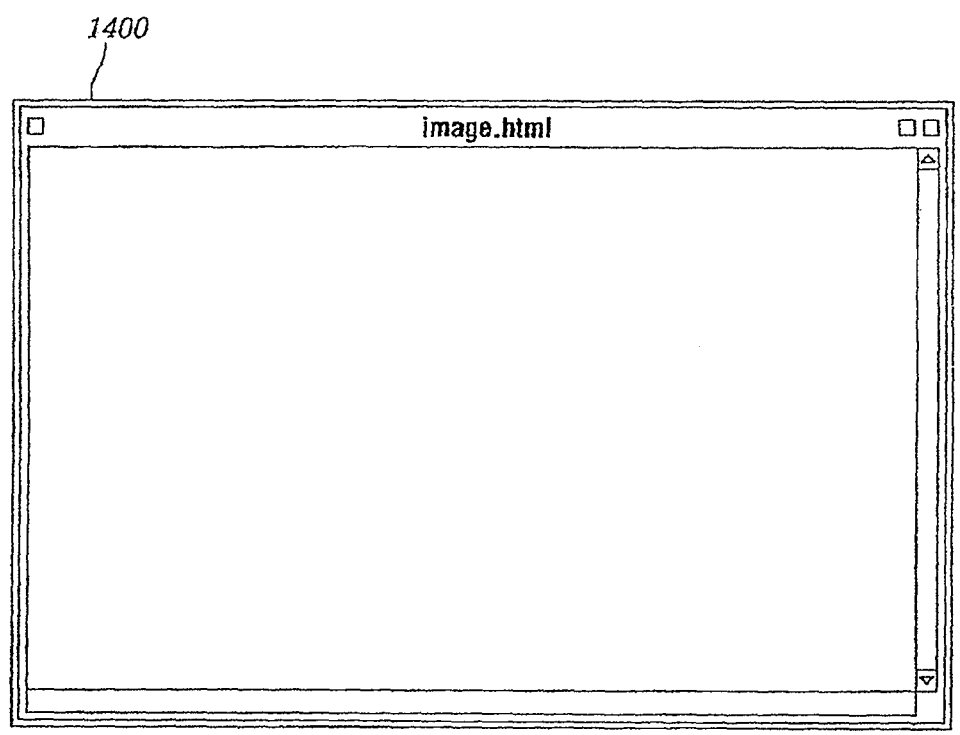
FIG. 14 shows a portion on an HTML document with a proprietary tag according to the invention.

FIG. 14 shows a portion on an HTML document with a proprietary tag 1400, <freerideimage></freerideimage> according to a preferred embodiment of the invention. The use of the term "freeride" refers to an internal code name for the invention.

Figure 15:
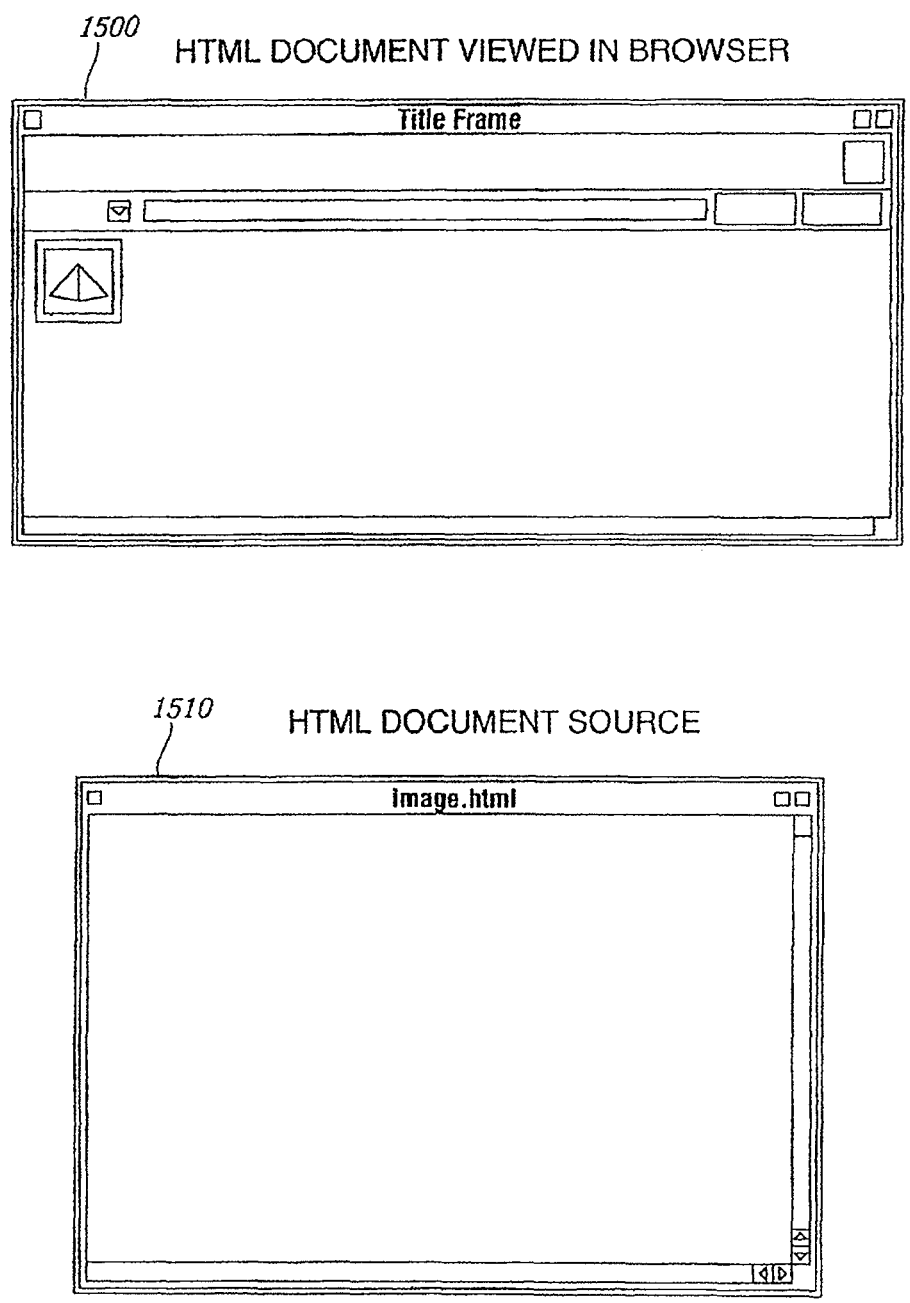
FIG. 15 shows an HTML document and an HTML document source according to the invention.

FIG. 15 shows an HTML document 1500 as viewed in a browser and an HTML document source 1510, according to a preferred embodiment of the invention. The use of the term "freeride" refers to an internal code name for the invention.

Figure 16:
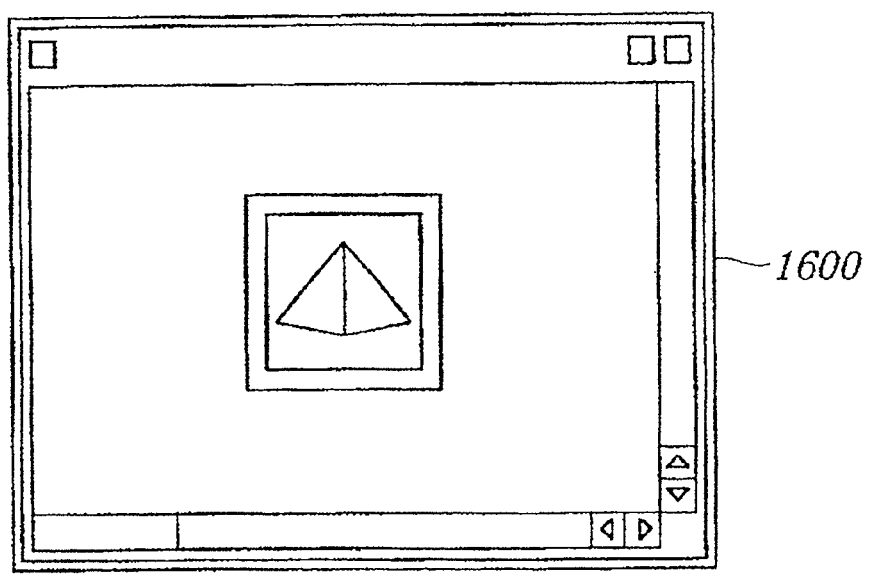
FIG. 16 shows a generated GIF image according to the invention.

FIG. 16 shows a generated GIF image 1600 according to a preferred embodiment of the invention.

Automatic Media Delivery System Operating in Parallel with Existing Web Site Infrastructure.

It should be noted that the words, media, graphics, and images are used herein interchangeably.

An automatic graphics delivery system that operates in parallel with an existing Web site infrastructure is provided. The system streamlines the post-production process by automating the production of media through content generation procedures controlled by proprietary tags placed within URLs embedded within Web documents. The author simply places the original media in the system, and adds proprietary tags to the URLs for accessing that media. The system automatically processes the URL encoded tags and automatically produces derivative media for the web site from the original media.

The system takes as input the client connection, server traffic, content generation procedures, and proprietary tags placed within the URL to generate optimized media for the client. The need for the Web author to create different versions of a Web site is reduced because the image content of the site is automatically handled by the system. In addition, the generated media is cached so that further requests for the same media require little overhead.

Because the invention takes the original media, content generation procedures, and proprietary URL tags as inputs for generating the Web media, it is possible to modify any of these inputs and have the system automatically update the media on the associated Web pages.

Figure 17:
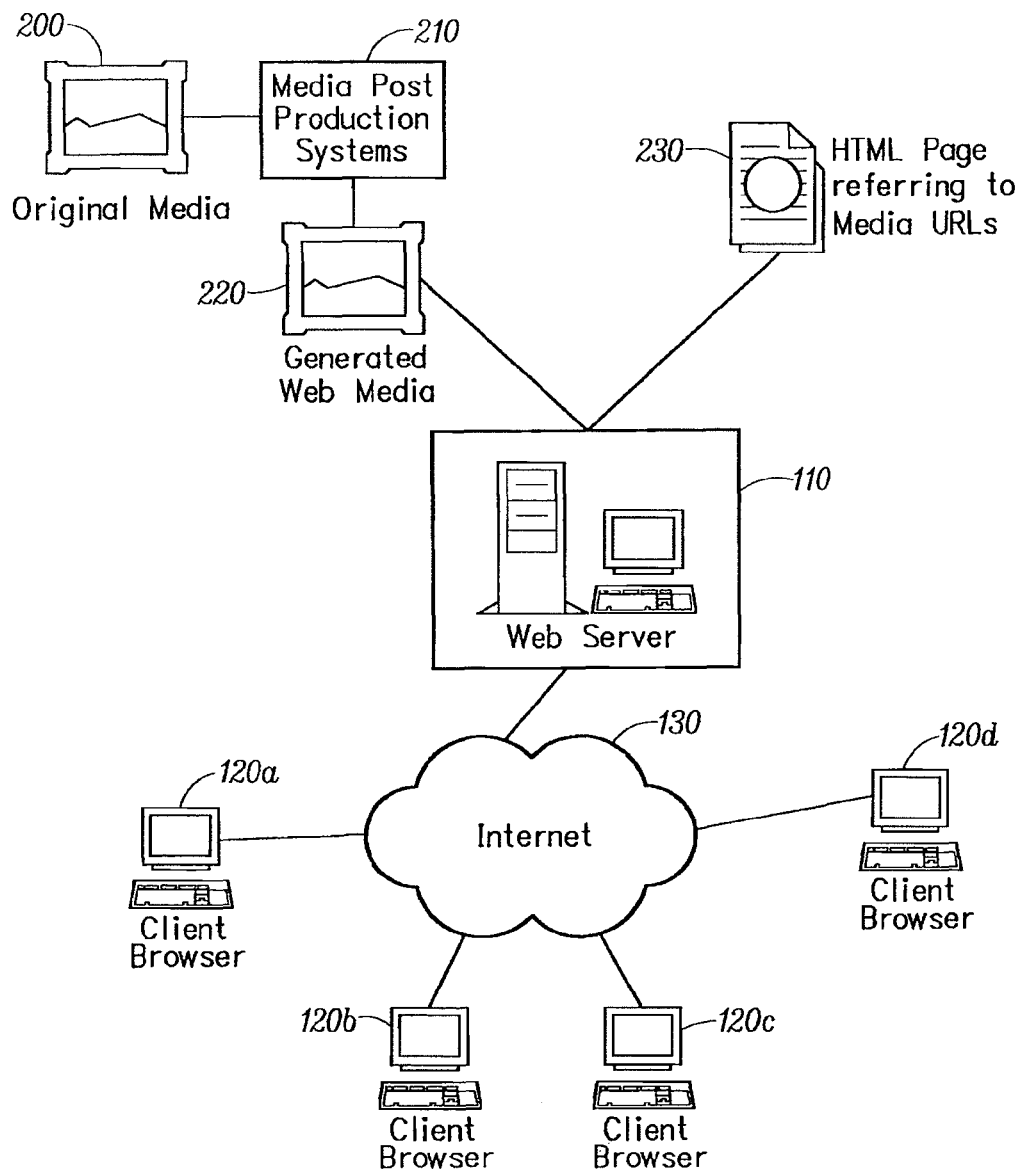
FIG. 17 is a schematic diagram of an image system within a typical Web infrastructure according to the invention.

A preferred embodiment of the invention is described with reference to FIG. 17. FIG. 17 is a schematic diagram of an image system within a typical Web infrastructure according to the invention. The image system 100 is placed in parallel to an existing Web server 110. The image system 100 may be on-site or off-site to the Web infrastructure. Multiple client browsers 120a-120d communicate with both the Web server 110 and the image server 100 via the Internet 130.

Figure 18:
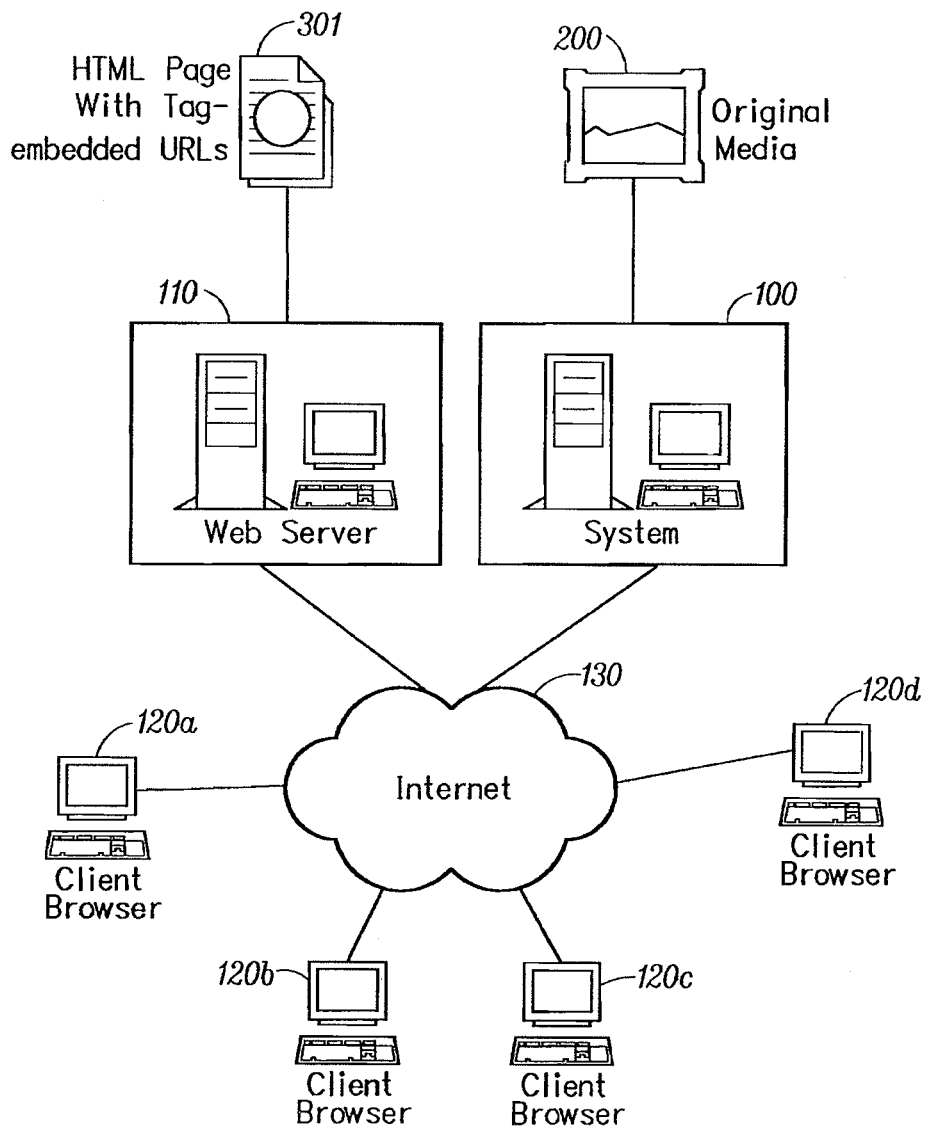
FIG. 18 is a schematic diagram showing delivery of an HTML document and original media according to the invention.

The delivery of an HTML document and media according to a preferred embodiment of the invention is described with reference to FIG. 18. Resource locators (URLs) are placed within HTML documents 301 accessible to the Web server 110. These URLs direct browsers to generate requests for media to the system 100. The system processes such URLs by interpreting the proprietary tags, executing the indicated image generation procedures on the original media 200, and returning derivative Web-safe media to client browsers 120a-120d via the Internet 130. Additionally, such generated media is cached on the image server 100 and, therefore need not be regenerated for subsequent requests.

Figure 19:
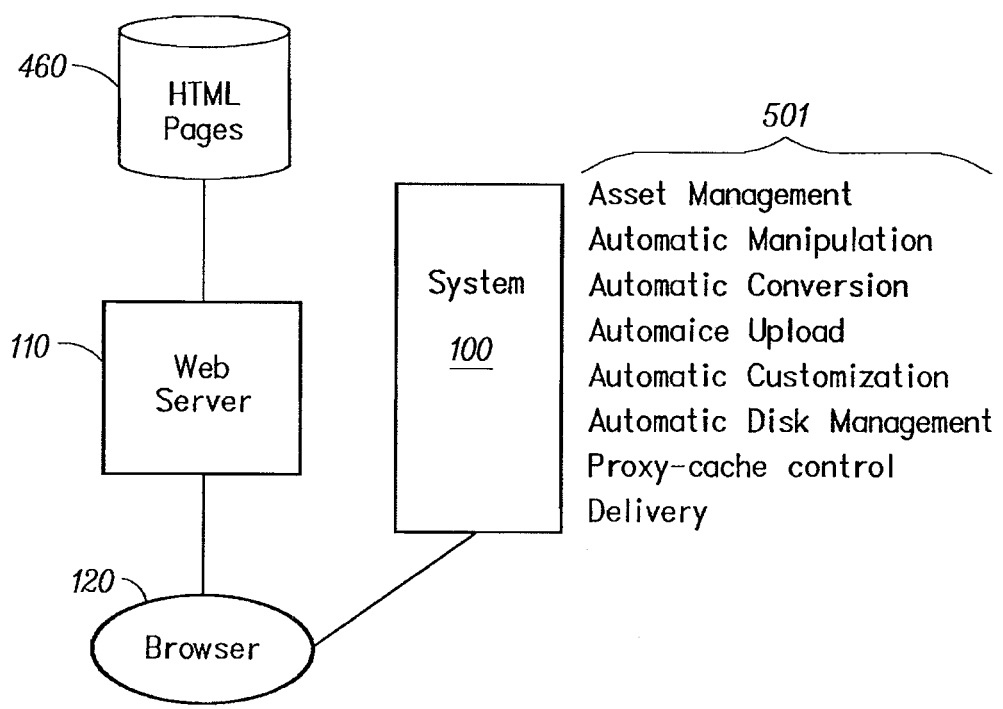
FIG. 19 is a schematic diagram showing components of Web site administration according to a preferred embodiment of the invention.

Web site administration according to another preferred embodiment of the invention is described with reference to FIG. 19. FIG. 19 is a schematic diagram showing the components of Web site administration according to a preferred embodiment of the invention, whereby Web site administration is simplified. The preferred embodiment provides, but is not limited to the following services: asset management, automatic image manipulation, automatic image conversion, automatic image upload, automatic image customization based on browser characteristics, automatic disk management, automatic control of proxy caching, and image delivery 501.

Figure 20:
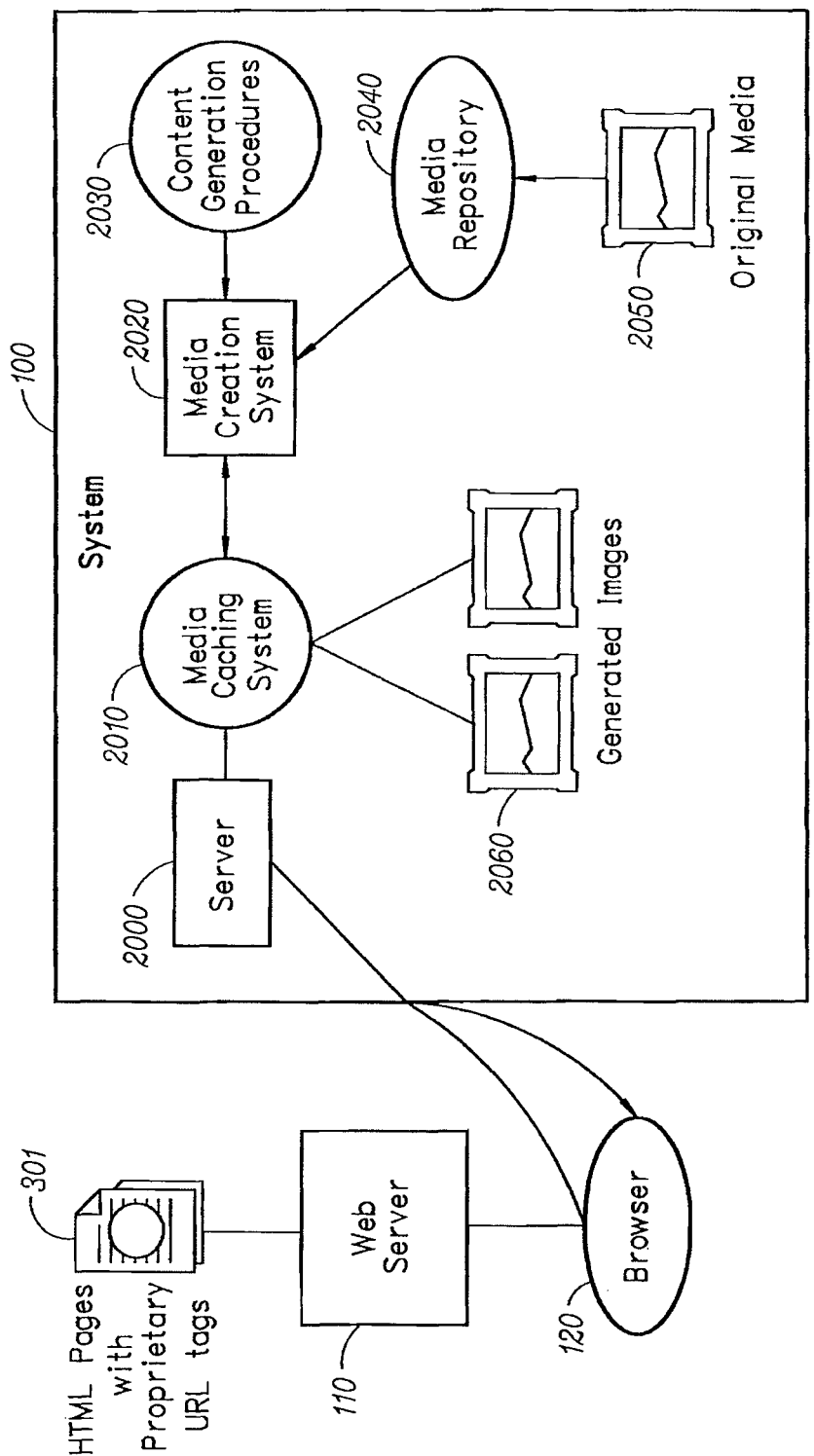
FIG. 20 is a simple overview showing components of the image system according to a preferred embodiment of the invention.

FIG. 20 is a simple overview showing components of the system according to a preferred embodiment of the invention. HTML pages with proprietary URL tags 301 describe how referenced media therein is to be manipulated for Web. Browsers 120 send such tags to the image system 100 as media requests. A server 2000 within the image system 100 receives the media requests, decodes the URL tags, and retrieves any media that already exists in the media caching system 2010. Non-existent media is subsequently generated by a media creation system 2020 using original media 2050 stored in a media repository 2040 and using content generation procedures 2030.

The Image System.

Following is a detailed description of the preferred embodiment of the invention with reference to FIG. 21 below.

The system receives a request for media through a URL containing proprietary tags for controlling image generation. The system parses this URL to determine the content generation procedure to execute, input to the content generation procedure, post-processing directives for, for example, zoom/pan/slice, browser properties, and any cache control directives. Such data is handed to a media caching subsystem that returns the requested image if found. If the image is not found, the information is handed to the media generation subsystem that executes the specified content generation procedure to produce a derivative image. The media generation subsystem returns one or more images to the media caching system for subsequent reuse.

The media caching subsystem is a mechanism for associating final or intermediate derivative media with the procedure, input, and user characteristics used to generate said media, specified through proprietary tags within the requested URL. This system may be implemented using a database, file system, or any other mechanism having capability to track such associations.

The media generation subsystem executes a primary content generation procedure to produce a derivative image whose identifier is provided to the media caching subsystem. This derivative image is composed of one or more original images acquired from the media repository. This media is then passed to the dynamic image content system, if necessary, to generate a subsequent derivative media suitably modified for the needs of zooming, panning, or slice. The resulting media is passed to the user profile system where it is again modified to account for any specific user browser characteristics specified using the proprietary URL tags. This media is then returned to the browser, along with any cache control directives encoded within the URL, and its identifier is passed to the media caching system for subsequent retrieval.

The dynamic content system operates on intermediate derivative images to generate image subsets or scalings used by Web site designers to implement zooming in on an image, panning across an image, slicing an image into parts, and the like for special Web page effects. The input to this system is cached by the media caching system such that the intermediate image need not be regenerated.

The user profile system operates on the final image about to be returned to the browser and may modify the image to account for individual needs of Web site users. The designer of a site is able to implement freely custom post-processing of images to meet the specific needs of their clients.

Figure 21:
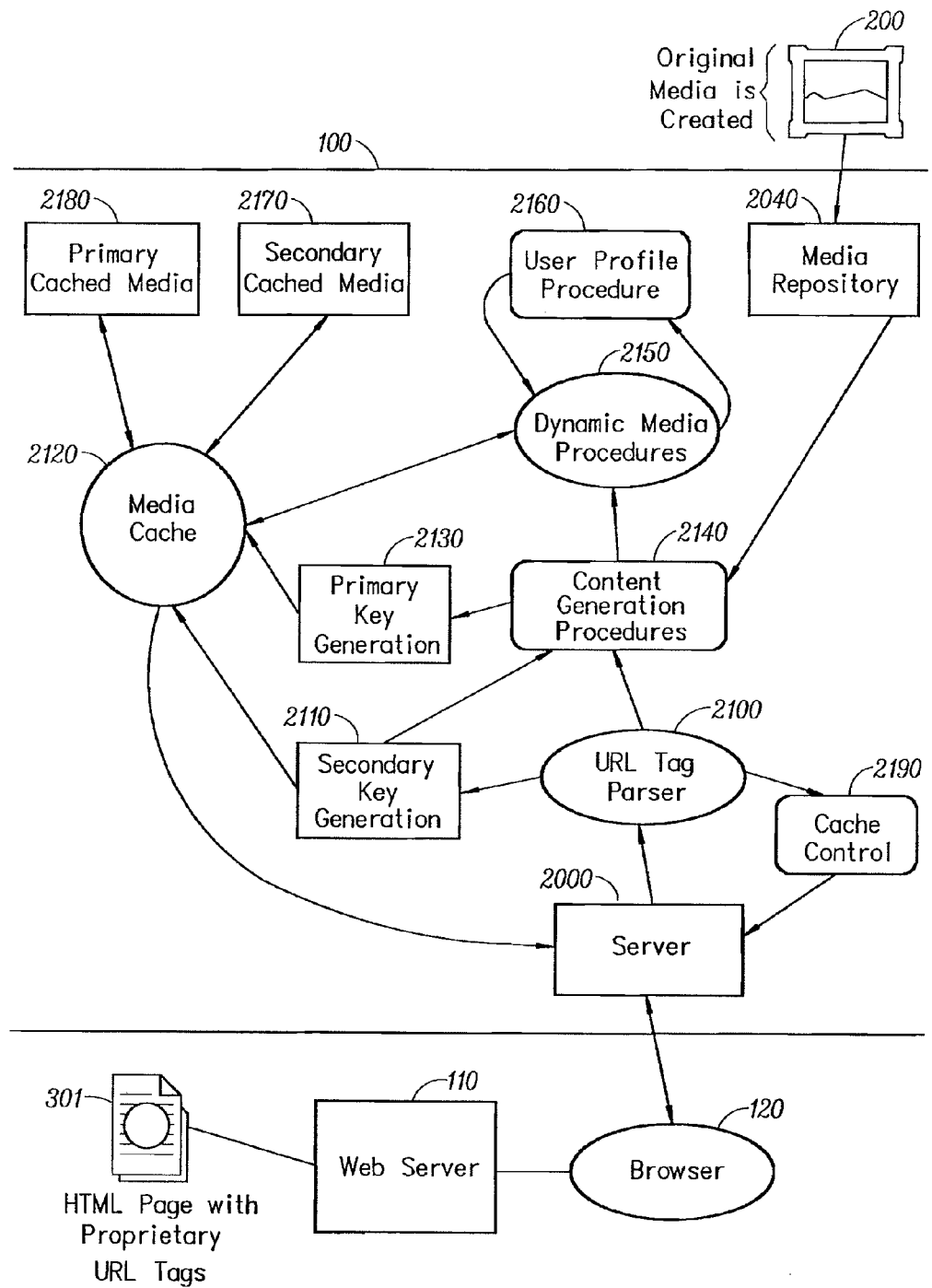
FIG. 21 is a schematic diagram showing process flow of a proprietary enabled page delivered to a Web browser according to a preferred embodiment of the invention.

FIG. 21 is a schematic diagram showing the process flow of a proprietary enabled page delivered to a Web browser according to a preferred embodiment of the invention. Original media 200 is created and placed into the system 100 in a media repository 2040. A content generation procedure 2140 is created with instructions on how the media is to be transformed to create the desired Web page content. An HTML page 301 is created for the Web site comprising the system 100, the page containing one or more URLs directing a browser 120 to request the specified content generation procedure 2140 from the system 100 using input parameters specified with proprietary tags encoded within the URL. The browser 120 requests the Web page 301 from the Web site 110. Upon receipt of the page 301, the browser contacts the system 100 requesting media specified in the URL. The system parses the URL 2100 to determine the content generation procedure 2140 to execute, any corresponding input parameters to be used by such procedure, any dynamic content processing 2150 to be performed by dynamic media procedures, any user profile information 2160 to be used to modify the resulting image, and any cache control HTTP headers 2190 the site instructs to accompany the resulting image.

The parser generates a unique primary lookup key 2110 for the specified resulting media. If the key corresponds to an existing generated media 2180, such media is returned immediately to the browser 120 through a media cache 2120, and the transaction is complete. Otherwise, a media generation occurs. In the case of media generation requiring dynamic content processing, a unique secondary lookup key corresponding to intermediate media is generated 2130. If intermediate media 2170 corresponding to this key is found, such media is passed directly to the dynamic media content system 2150 having dynamic media procedures, wherein appropriate action is taken to generate the required derivative from the intermediate media data. A unique key is generated for the derivative 2130 and passed to the media caching system 2120. If the media caching system finds no such intermediate image, such intermediate image is generated according to instructions specified by the content generation procedure, cached by the media cache system 2120 as a secondary cached media 2170, and passed to the dynamic media system 2150. Again, appropriate action is taken to generate the required derivative from the intermediate image data.

The resulting image after any dynamic media processing is complete, is checked to ensure that the image is in a valid Web image format. If not, the image is automatically converted into a valid format.

The final media is passed to a user profile system 2160 wherein browser characteristics specified through proprietary tags within the URL are inspected, and appropriate modification to the media is performed, based on such characteristics. The resulting image is handed to the media cache system 2120 for caching and returned to the browser 120.

Figure 22:
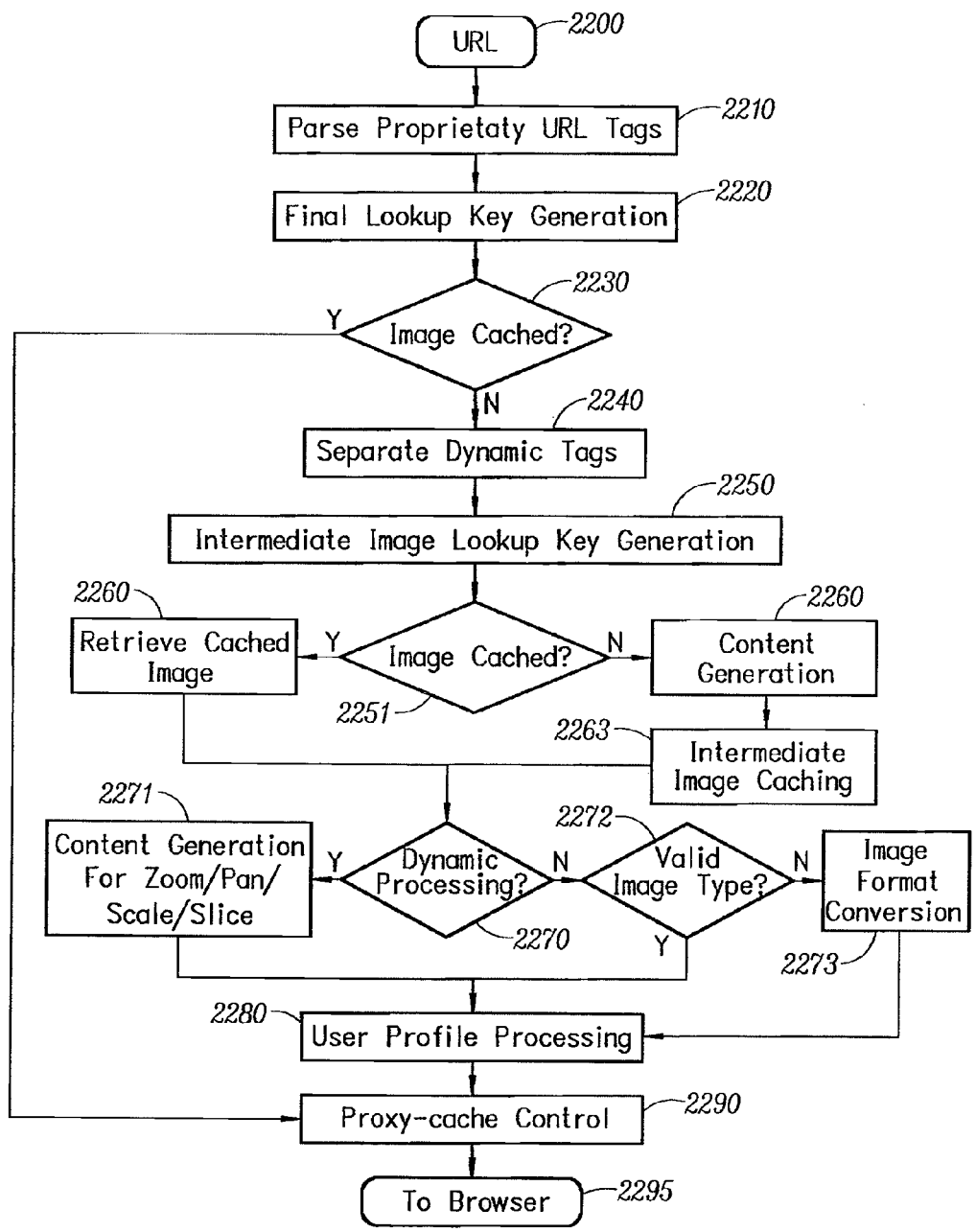
FIG. 22 shows a flowchart of a content generation procedure according to a preferred embodiment of the invention.

FIG. 22 shows a flowchart of the content generation procedure according to a preferred embodiment of the invention. A URL containing proprietary tags (2200) is parsed (2210) to determine the content generation procedure to execute, any dynamic modifications to the media, user profile characteristics, and proxy-cache control. A unique final lookup key is generated for the media (2220) and the media cache is checked (2230). If the indicated media exists, control passes to proxy-cache control (2290) and the media is delivered to the browser (2295). Otherwise, dynamic media system tags are separated from content generation control tags (2240) and a unique intermediate image lookup key is generated (2250). The cache is then checked for such intermediate media (2261). If such intermediate media is found, it is used directly for dynamic processing, if required. Otherwise, content is generated (2262) and cached (2263), and the result is evaluated for dynamic processing (2270). If dynamic processing is required, the media is operated upon by the dynamic content generator (2271), otherwise it is evaluated for valid content type (2272). If the content type is invalid, the media is automatically converted to a valid type (2273). The resulting image is then customized by the user profiling system (2280) for specified browser or client attributes. Finally, any cache-control directives specified are attached to the response (2290) and the media is delivered to the browser (2295).

Figure 23:
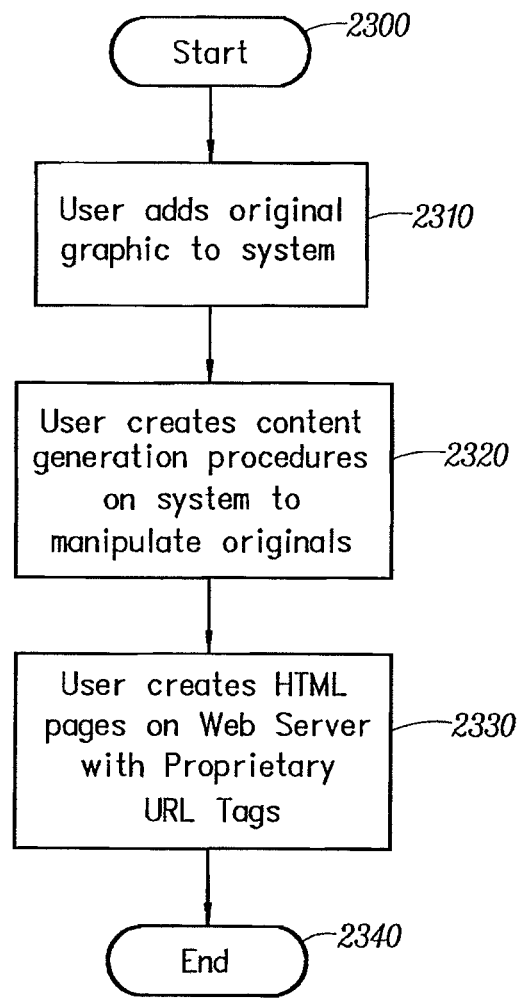
FIG. 23 is a flow chart showing an authoring process according to a preferred embodiment of the invention.

FIG. 23 is a flow chart showing an authoring process according to a preferred embodiment of the invention. The process starts (2300) when a user adds an original graphic or other media (2310) to the system. The author then creates a content generation procedure (2320) containing instruction on how the original media should be processed to generate the desired Web page content. The user then creates an HTML document (2330) that refers to that image by using a URL pointing to a content generation procedure on the image server. The system ends (2340). The authoring subsystem assists the Web site designer with choosing parameters and with designing the content generation procedure such that the desired Web site graphic is obtained.

It should be appreciated that differences exist between specifying an image with a URL and requesting an image using a content creation process that interprets proprietary parameters encoded within a URL. That is, URLs allow Web site designers to load specific graphic images into a Web page. In contrast and according to the invention, URLs containing proprietary content creation tags initiate a process whereby graphic images for a site are automatically produced.

Table D below is a list of example proprietary URL tags used for content generation within the system according to the preferred embodiment of the invention. Additional tags may be added to the system as necessary.

TABLE D

| Tags |
|---|
| f = function |
|     Names the content creation procedure used to generate all or part of the desired graphic. |
| args = arguments |
|     Supplies page dependent parameters used to control the content creation procedure from within the Web page. |
| cr = crop rectangle |
|     Specifies that portion of the image generated by the content generation procedure to be returned to the browser. |
| st = slice table |
|     Specifies a rectangular grid to be placed over the image produced by the content generation procedure, each portion of which can be returned to the browser. |
| sp = slice position |
|     Specifies that portion of the slice table grid placed over the image generated by the content creation procedure to be returned to the browser. |
| is = image size parameter |
|     Specifies scale factors to be applied to any portion of an image generated by any combination of a content generation procedure, arguments, crop rectangles, slice tables, and slice positions. |
| p = user profile string |
|     Specifies a user profile identifier used to modify the final image prior to returning the image to the browser, thus allowing clients to modify the image returned to the browser to account for individual browsing conditions. |
| c = cache control |
|     Specifies a proxy-cache control string to accompany the returned image within an HTTP header. |

Table E below is a list of example supported content creation commands according to a preferred embodiment of the invention. Additional commands may be added as necessary.

TABLE E

Content Creation Commands

Adjust HSB
    Allows the HSB of an image to be altered.
Adjust RGB
    Allows the contrast, brightness, and color balance of an image to be altered.
Colorize
    Alters the hue of the pixels in the image to that of the specified color.
Brush Composite
    Composites the specified brush image onto the current target image.
Convert
    Converts the rasters to the specified type/bit-depth.
Crop
    Crops the media to the specified size.
Dropshadow
    Adds a drop shadow to the image, based on the alpha-channel.
Equalize
    Performs an equalization on the relevant components of the media.
FixAlpha
    Adjusts the RGB components of an image relative to its alpha-channel.
Flip
    Flips the media vertically or horizontally.
Glow
    Produces a glow or halo around the image.
Load
    Loads in a media from the specified file.
Normalize
    Similar to equalize, but for audio.
Reduce
    Reduces the image to a specified palette.
Rotate
    Rotates the media clockwise by the specified angle in degrees.
Save
    Saves the media to the specified file.
Scale
    Scales the media to the specified size.
SetColor
    Allows the background color, foreground color, and transparency state of the media to be set.
Text Drawing
    Composites the specified text onto the image.
Text Making
    This command, instead of compositing text onto the target, creates a new image that just encloses the text.
Zoom
    Zooms in on a specified portion of the media, and fits it to the specified size. Effectively this constitutes a crop followed by a scale.

Table F below lists comprises some, and is not limited to all major features of a preferred embodiment of the invention. Additional features may be added as necessary.

TABLE F

System Features

Reads and writes various file formats;
Supports many image processing operations;
Dynamically creates Web images from original assets;
Dynamically creates thumbnail images;
Dynamically and efficiently creates images that can be panned, zoomed, or sliced from original assets without Browser plugins;
Automatically propagates changes in original assets throughout the Web site;
Uses an intelligent caching mechanism for both final and intermediate graphics, comprising:
    Clean up cache on demand;

TABLE F-continued

System Features

Eliminates orphaned Web files; and
    Optimizes Web server cache by providing most recent images;
Renders True-Type fonts on server instead of browser;
Uses intelligent scaling of line drawings;
Allows Web designers to manipulate images using a combination of content generation procedures and proprietary URL tags;
Preserves original image assets;
Optimizes Web server traffic by adjusting the bandwidth of graphics;
Optimizes images for client connection speed;
Allows clients to specify the quality of images on a Web site;
Allow site-specific customized image optimizations for a variety of purposes; and
Allows Web designers to dynamically create images by manipulating proprietary URL tags in applications.

Accordingly, although the invention has been described in detail with reference to a particular preferred embodiment, persons possessing ordinary skill in the art to which this invention pertains will appreciate that various modifications and enhancements may be made without departing from the spirit and scope of the claims that follow.

The invention claimed is:

1. A non-transitory computer program product for causing a computing system to dynamically transcode media content to be presented on a client presentation system, the computer program product comprising:

one or more computer-readable media, the one or more computer-readable media having stored thereon computer-executable instructions that, when executed by one or more processors of the computing system, cause the computing system to perform the following:

an act of receiving a request for media content to be delivered to a client presentation system, wherein the requested media content has a limited number of base transcoding profiles associated therewith, each base transcoding profile corresponding to a cached version of the requested media content;

at the time of the request, and without input by a network administrator, an act of automatically identifying transcoding parameters to be applied to the requested media content prior to delivery to the client presentation system, wherein identification of transcoding parameters is based on one or more formats of any client presentation system;

an act of transcoding the requested media content in accordance with the identified transcoding parameters, such that the identified transcoding parameters are used to perform additional incremental transcoding on top of the base transcoding profile;

wherein the act of act of transcoding the requested media content in accordance with the identified transcoding parameters comprises:

an act of selecting a pre-existing base transcoded version of the requested media content comprising intermediate derivative media that has been transcoded in accordance with only a portion of the identified transcoding parameters; and an act of creating a final version by incrementally performing further transcoding of the pre-existing base transcoded version in accordance with a remaining portion of the identified transcoding parameters;

an act of causing the transcoded media content to be delivered to the client presentation system; and an act of caching the transcoded media content.

2. A non-transitory computer program product in accordance with claim 1, wherein the act of receiving a request for media content is performed by receiving the request over the Internet.

3. A non-transitory computer program product in accordance with claim 1, wherein the client presentation system is a first client presentation system, the method further comprising:
   an act of receiving a request for the media content to be delivered to a second client presentation system;
   an act of determining that the transcoding parameters to be applied to the requested media content prior to delivery to the second client presentation system are the same as the transcoding parameters that were applied to the requested media content prior to delivery to the first client presentation system; and
   an act of delivering the cached transcoded media content, rather than separately transcoding the requested media content again for the second client presentation system.

4. A non-transitory computer program product in accordance with claim 1, wherein the requested media content is video media.

5. A non-transitory computer program product in accordance with claim 1, wherein the identified transcoding parameters includes at least video size parameters.

6. A non-transitory computer program product in accordance with claim 1, wherein the method further comprises:
   prior to the act of transcoding, an act of determining that a transcoded representation of the requested media content transcoded using the identified transcoding parameters does not already exist.

7. A non-transitory computer program product in accordance with claim 1, wherein the act of identifying transcoding parameters comprises an act of selecting a transcoding profile from a set of pre-existing transcoding profiles.

8. A non-transitory computer program product in accordance with claim 1, wherein the act of identifying transcoding parameters comprises:
   an act of reading one or more transcoding parameters from the request; and
   an act of identifying the one or more transcoding parameters from the request as being the identified transcoding parameters to be applied.

9. A method for accessing dynamically transcoding media content, the method comprising:
   an act of receiving a request for media content to be delivered to a client presentation system for media content, wherein the requested media content has a limited number of base transcoding profiles associated therewith, each base transcoding profile corresponding to a cached version of the requested media content;
   at the time of the request, and without input by a network administrator, an act of automatically identifying transcoding parameters to be applied to the requested media content prior to delivery to the client presentation system, wherein identification of transcoding parameters is based on one or more formats of any client presentation system;
   an act of determining that the transcoding parameters to be applied to the requested media content prior to delivery to the client presentation system are the same as transcoding parameters that are being applied to the requested media content prior to delivery to another client presentation system;
   an act of transcoding the requested media content in accordance with the identified transcoding parameters, such that the identified transcoding parameters are used to perform additional incremental transcoding on top of the base transcoding profile;
   wherein the act of act of transcoding the requested media content in accordance with the identified transcoding parameters comprises:
      an act of selecting a pre-existing base transcoded version of the requested media content comprising intermediate derivative media that has been transcoded in accordance with only a portion of the identified transcoding parameters; and
      an act of creating a final version by incrementally performing further transcoding of the pre-existing base transcoded version in accordance with a remaining portion of the identified transcoding parameters; and
   an act of delivering the transcoded media content to both client presentation systems concurrently.

10. A non-transitory computer program product for causing a computing system to dynamically transcode media content to be presented on a client presentation system, the computer program product comprising:
   one or more computer-readable physical and/or memory storage media, the one or more computer-readable memory media having stored thereon computer-executable instructions that, when executed by one or more processors of the computing system, cause the computing system to perform the following:
      maintaining a transcoding profile library, the transcoding profile library comprising a plurality of transcoding profiles for media content;
      an act of receiving a request for media content to be delivered to a client presentation system, wherein the requested media content has a limited number of base transcoding profiles associated therewith, each base transcoding profile corresponding to a cached version of the requested media content;
      an act of identifying transcoding parameters to be applied to the requested media content prior to delivery to the client presentation system;
      determining whether an existing base transcoding profile exists within the transcoding profile library corresponds to the requested media content transcoded for delivery to the client presentation system;
      an act of transcoding the requested media content in accordance with the identified transcoding parameters, such that the identified transcoding parameters are used to perform additional incremental transcoding based on multiple transcoding parameters on top of a base transcoding profile;
      wherein the act of act of transcoding the requested media content in accordance with the identified transcoding parameters comprises:
         an act of selecting a pre-existing base transcoded version of the requested media content comprising intermediate derivative media that has been transcoded in accordance with only a portion of the identified transcoding parameters; and
         an act of creating a final version by incrementally performing further transcoding of the pre-existing base transcoded version in accordance with a remaining portion of the identified transcoding parameters;
      an act of delivering the transcoded media content to the client presentation system;
      adding a new transcoding profile to the transcoding profile library corresponding to the identified transcoding parameters and the base transcoding profile; and
      an act of caching the transcoded media content.

11. A computer program product in accordance with claim 10, wherein the act of receiving a request for media content is performed by receiving the request over the Internet.

12. A computer program product in accordance with claim 10, wherein the client presentation system is a first client presentation system, the method further comprising:
   an act of receiving a request for the media content to be delivered to a second client presentation system;
   an act of determining that the transcoding parameters to be applied to the requested media content prior to delivery to the second client presentation system are the same as the transcoding parameters that were applied to the requested media content prior to delivery to the first client presentation system; and
   an act of delivering the cached transcoded media content, rather than separately transcoding the requested media content again for the second client presentation system.

13. A computer program product in accordance with claim 12, wherein act of caching the transcoded media content comprises an act of first caching a transcoded stream of the transcoded media content while the act of transcoding is still occurring, and further caching a transcoded file of the transcoded media content after the act of transcoding has completed.

14. A computer program product in accordance with claim 13, wherein the act of delivery the cached transcoded media content comprises:
   an act of providing the transcoded stream to the second client presentation system.

15. A computer program product in accordance with claim 13, wherein the act of delivery the cached transcoded media content comprises:
   an act of providing the transcoded file to the second client presentation system.

16. A computer program product in accordance with claim 11, wherein the requested media content is video media.

17. A computer program product in accordance with claim 11, wherein the identified transcoding parameters includes at least video size parameters.

18. A computer program product in accordance with claim 11, wherein the method further comprises:
   prior to the act of transcoding, an act of determining that a transcoded representation of the requested media content transcoded using the identified transcoding parameters does not already exist.

19. A computer program product in accordance with claim 11, wherein the act of identifying transcoding parameters comprises an act of selecting a transcoding profile from a set of pre-existing transcoding profiles.

20. A computer program product in accordance with claim 11, wherein the act of identifying transcoding parameters comprises:
   an act of reading one or more transcoding parameters from the request; and
   an act of identifying the one or more transcoding parameters from the request as being the identified transcoding parameters to be applied.

* * * * *